US010051994B2

(12) United States Patent
Dunn et al.

(10) Patent No.: US 10,051,994 B2
(45) Date of Patent: Aug. 21, 2018

(54) CONTAINER AGITATOR AND WARMER

(71) Applicant: MUNCHKIN, INC., Van Nuys, CA (US)

(72) Inventors: Steven Bryan Dunn, Beverly Hills, CA (US); Nairi Khachikian, Glendale, CA (US); Kevin D. Johnson, Tarzana, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 14/797,965

(22) Filed: Jul. 13, 2015

(65) Prior Publication Data
US 2016/0015209 A1 Jan. 21, 2016

Related U.S. Application Data

(60) Provisional application No. 62/025,972, filed on Jul. 17, 2014.

(51) Int. Cl.
A23C 3/02 (2006.01)
A47J 36/24 (2006.01)

(52) U.S. Cl.
CPC ................. A47J 36/2438 (2013.01)

(58) Field of Classification Search
CPC .................................. A47J 36/2438
USPC ...... 99/275, 323.3, 324, 326, 331, 450, 453, 99/467, 470, 483; 219/200, 201, 385, 219/386, 520, 521, 628, 726; 222/146.1, 222/142.2, 146.5; 426/231
See application file for complete search history.

(56) References Cited

U.S. PATENT DOCUMENTS

| 2,012,981 A | 9/1935 | Wilsey |
| 2,640,907 A | 6/1953 | Morey |
| 2,700,097 A | 1/1955 | Morey |
| 2,813,189 A | 9/1957 | Lawler |
| 2,895,718 A * | 7/1959 | Prather ................... A47J 36/24 165/80.5 |
| 2,992,316 A | 7/1961 | Baumstein et al. |

(Continued)

FOREIGN PATENT DOCUMENTS

EP 1817992 8/2007
WO WO2016011382 1/2016

OTHER PUBLICATIONS

International Search Report, dated Oct. 8, 2015.
International Search Report and Written Opinion for PCT/US2015/040955, dated Feb. 1, 2018.

Primary Examiner — Dana Ross
Assistant Examiner — Joseph Iskra
(74) Attorney, Agent, or Firm — Robert Z. Evora, Esq.; Christian Lek

(57) ABSTRACT

A warming device that heats and agitates a container. The warming device has a housing having an enclosed chamber and a concentric warming chamber adapted to receive a first fluid. A concentric basket is provided that is adapted to fit within the warming chamber. The concentric basket secures the container partially submerged within the first fluid. At least one heating element is provided to heat the first fluid in the warming chamber to warm an exterior surface of the container. A motor is provided to agitate and warm a second fluid in the container by rotating the concentric basket at a predetermined rate. A control panel provides various signal instructions to the heating element and the motor.

18 Claims, 31 Drawing Sheets

(56) References Cited

U.S. PATENT DOCUMENTS

| | | | | |
|---|---|---|---|---|
| 3,062,073 A | * | 11/1962 | Brass | F16H 1/46 |
| | | | | 475/329 |
| 4,597,435 A | | 7/1986 | Fosco | |
| 5,808,276 A | | 9/1998 | Padilla | |
| 5,842,901 A | | 12/1998 | Montgomery | |
| 5,882,113 A | | 3/1999 | Binder | |
| 6,417,498 B1 | * | 7/2002 | Shields | A47J 36/2427 |
| | | | | 219/386 |
| 6,571,564 B2 | | 6/2003 | Upadhye et al. | |
| 6,705,580 B1 | * | 3/2004 | Bain | B60N 3/106 |
| | | | | 248/311.2 |
| 7,287,386 B2 | | 10/2007 | Upadhye et al. | |
| 2008/0304356 A1 | * | 12/2008 | Zhuang | A47J 43/042 |
| | | | | 366/239 |
| 2011/0033587 A1 | * | 2/2011 | Jong | A47J 36/2438 |
| | | | | 426/231 |
| 2012/0061376 A1 | | 3/2012 | McBean et al. | |
| 2014/0069606 A1 | | 3/2014 | Lee | |
| 2014/0072287 A1 | * | 3/2014 | Zakowski | A47J 36/2411 |
| | | | | 392/394 |

\* cited by examiner

CONTAINER AGITATOR AND WARMER

CROSS REFERENCE TO RELATED APPLICATION

This application incorporates and claims the benefit of the filing date of U.S. Provisional Patent Application Ser. No. 62/025,972, entitled "ROTATING WARMING DEVICE" filed Jul. 17, 2014, the entirety of which is incorporated herein by reference.

TECHNICAL FIELD

The subject disclosure relates to an apparatus for warming a bottle. More particularly, the present disclosure relates to a device for rapidly and uniformly warming a fluid in a container by simultaneously rotating and warming the fluid within the bottle.

BACKGROUND

Various benefits are realized by a breastfeeding mother and infant. Breastfeeding is as healthy for mothers as it is for their babies. Lactation provides many short and long-term health benefits. It is clear that breastfeeding provides mothers with more than just short-term benefits in the early period after birth. A number of studies have shown other potential health advantages that mothers can enjoy through breastfeeding. These include optimal metabolic profiles, reduced risk of various cancers, and psychological benefits. Likewise, there are a myriad of advantages to the infant as well.

Breast milk is the best dietary nutrient for a baby, and the benefits of breastfeeding extend well beyond basic nutrition. In addition to containing all the vitamins and nutrients your baby needs in the first six months of life, breast milk is packed with disease-fighting substances that protect your baby from illness. As such, it is important to preserve these protective nutrients and substances contained within the breast milk during storage.

When a parent refrigerates breast milk, fat from the milk separates and sticks to the sides of a bottle or container holding the natural breast milk. Unfortunately, not realizing that proteins and nutrients in breast milk are easily broken down, a parent may unnecessarily heat and/or shake the bottle to mix the fat back into the milk upon feeding. However, it is known that aggressively shaking breast milk will denature the important proteins the baby needs and break them apart rendering them useless. Accordingly, there is a need for the development of a warming device that gently mixes and warms the solution while preserving the important nutrients and essential disease-fighting substances in the natural breast milk.

BRIEF DESCRIPTION OF THE DRAWINGS

Various exemplary embodiments of this disclosure will be described in detail, wherein like reference numerals refer to identical or similar components or steps, with reference to the following figures, wherein:

FIG. 10 depicts various exemplary containers for use, including but not limited to a glass jar, an infant bottle, and the like.

FIG. 36 illustrates another exemplary construction for separable housing in which the lower control, drive and heating compartment can be separated from an upper warming chamber for cleaning purposes and the like.

DETAILED DESCRIPTION

Particular embodiments of the present invention will now be described in greater detail with reference to the figures.

FIGS. 1-9 illustrate various views of an exemplary warming device 100. As shown, the warming device 100 may take a variety of different sizes and/or shapes, such as in FIGS. 1-3 where the exterior shape is somewhat oval shapes and in FIGS. 4-8 where the outer shape is cylindrical.

Figure 9:
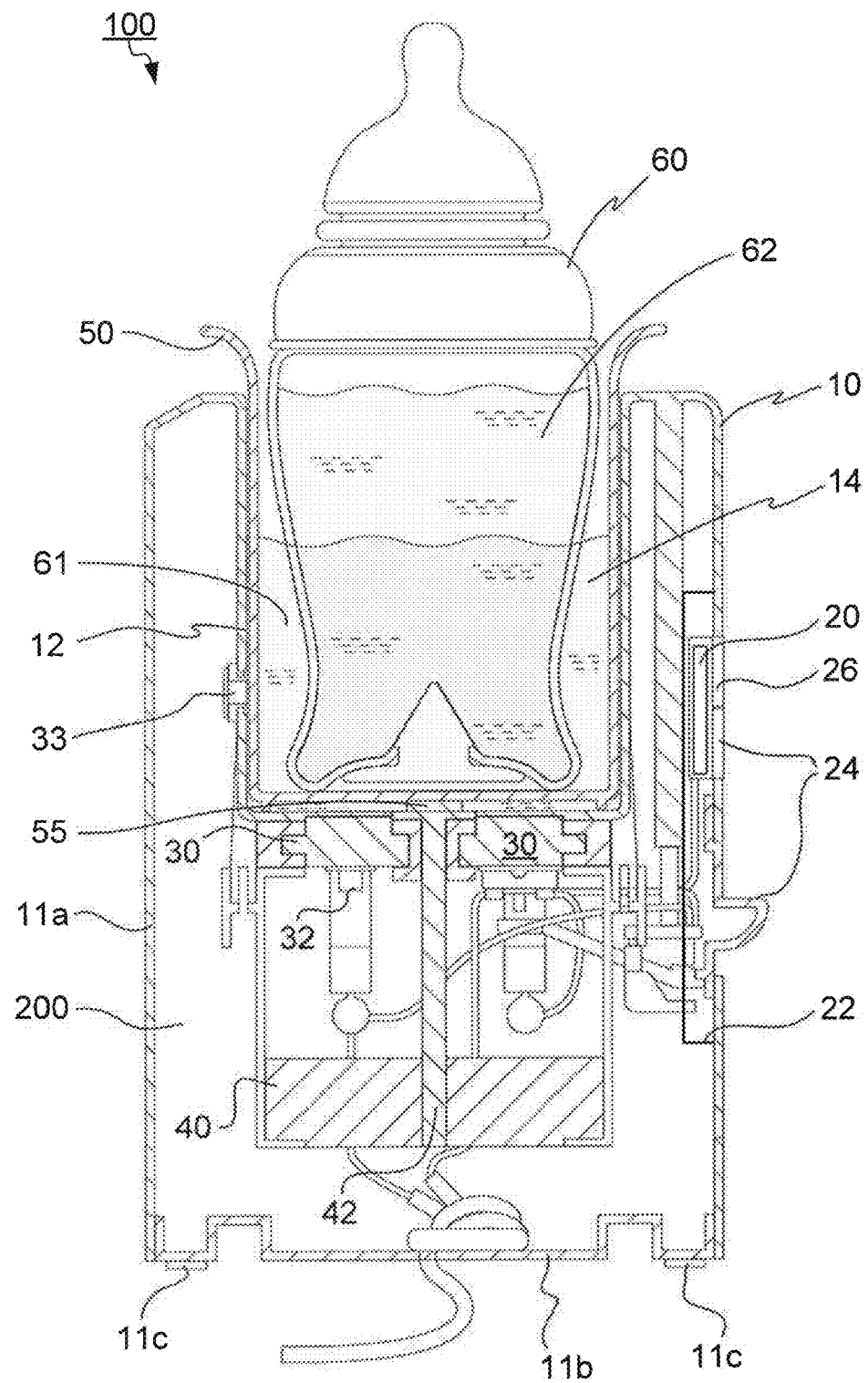
FIG. 9 illustrates an exemplary warming device with a container partially submerged in a warming bath reservoir with a first connection between a heating element and a bottom of the basket according to the subject disclosure.

Referring to FIG. 9, in use, the warming device 100 is actuated by an input 24 to agitate and warm a first fluid 61 in a warming chamber 12 disposed within a housing 10, which in turn warms a second fluid 62 disposed inside of a container 60 by heat transfer. In particular, the second fluid 62 is uniformly rotated and warmed by rotation and a warming mechanism disposed inside of the warming container 60 to evenly and more quickly heat the second fluid 62. The simultaneous warming and rotating warms the second fluid 62 in the container 60 more uniformly while preserving nutrients, proteins and antibodies in the second fluid 62 (such as breast milk) in a more efficient manner according to this subject disclosure.

Figure 10:
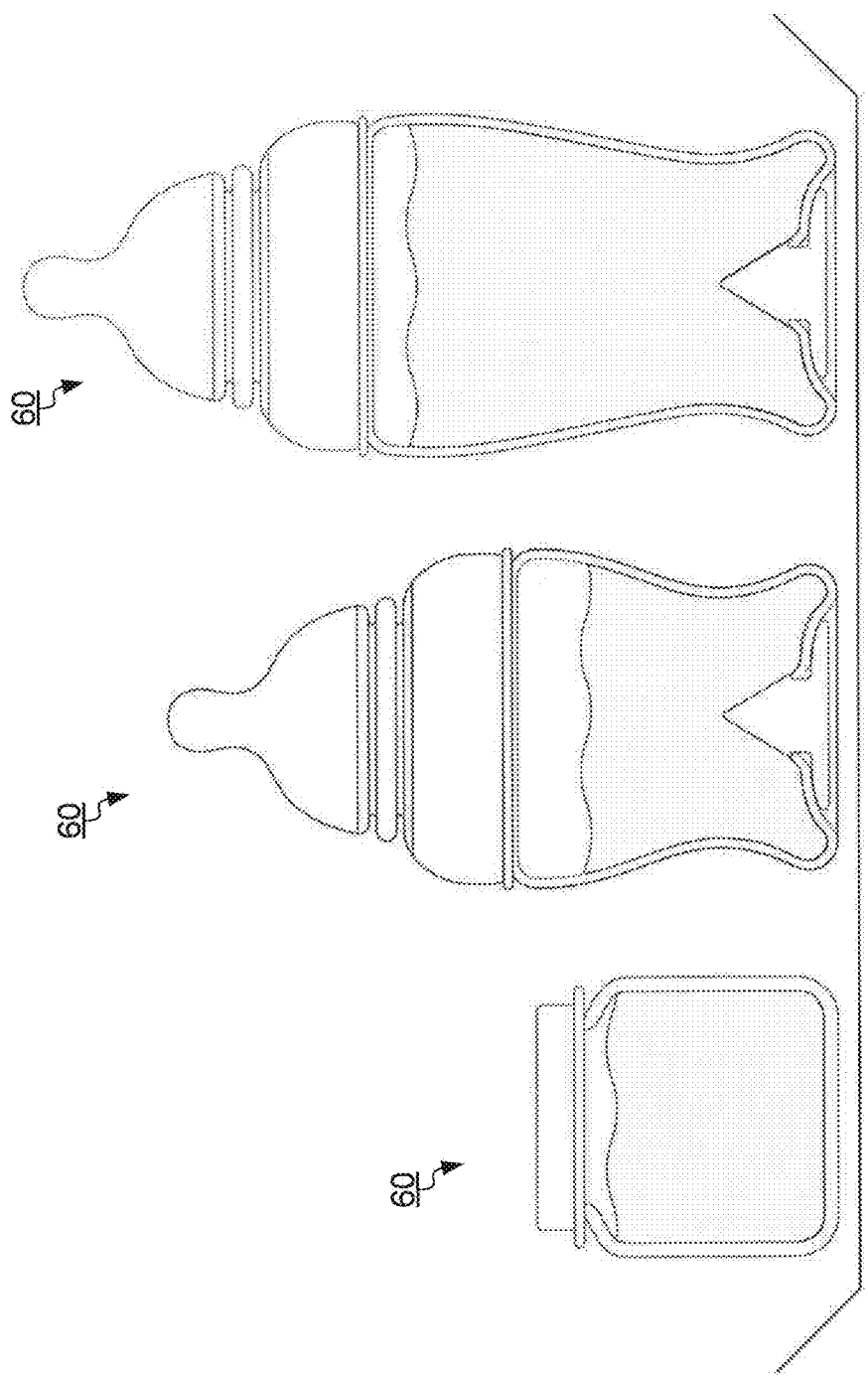

FIG. 10 demonstrates that various containers 60 may be used with the warming device 100. That is, the containers 60 used with the warming device 100 may have a number of different material composition, sizes and/or shapes and may extend beyond the examples shown herein.

Referring to FIG. 9, the warming device 100 includes a housing 10 with a warming chamber 12 having a reservoir 14. The warming chamber 12 is adapted to receive a removable basket 50 to be rotated concentrically therein. The removable basket 50 is adapted to secure a container 60 therein. The warming device 100 includes a heating element 30 and a motor 40 adapted to warm and rotate the container 60 within the removable basket 50. The housing 10 includes an electronic control circuit unit (ECU) 20 electronically connected to control panel 22. The control panel 22 has various input/output device elements 24 and a display 26. The ECU 20 is electrically connected to control the heating element 30 and the motor 40 disposed within the housing 10.

Figure 8:
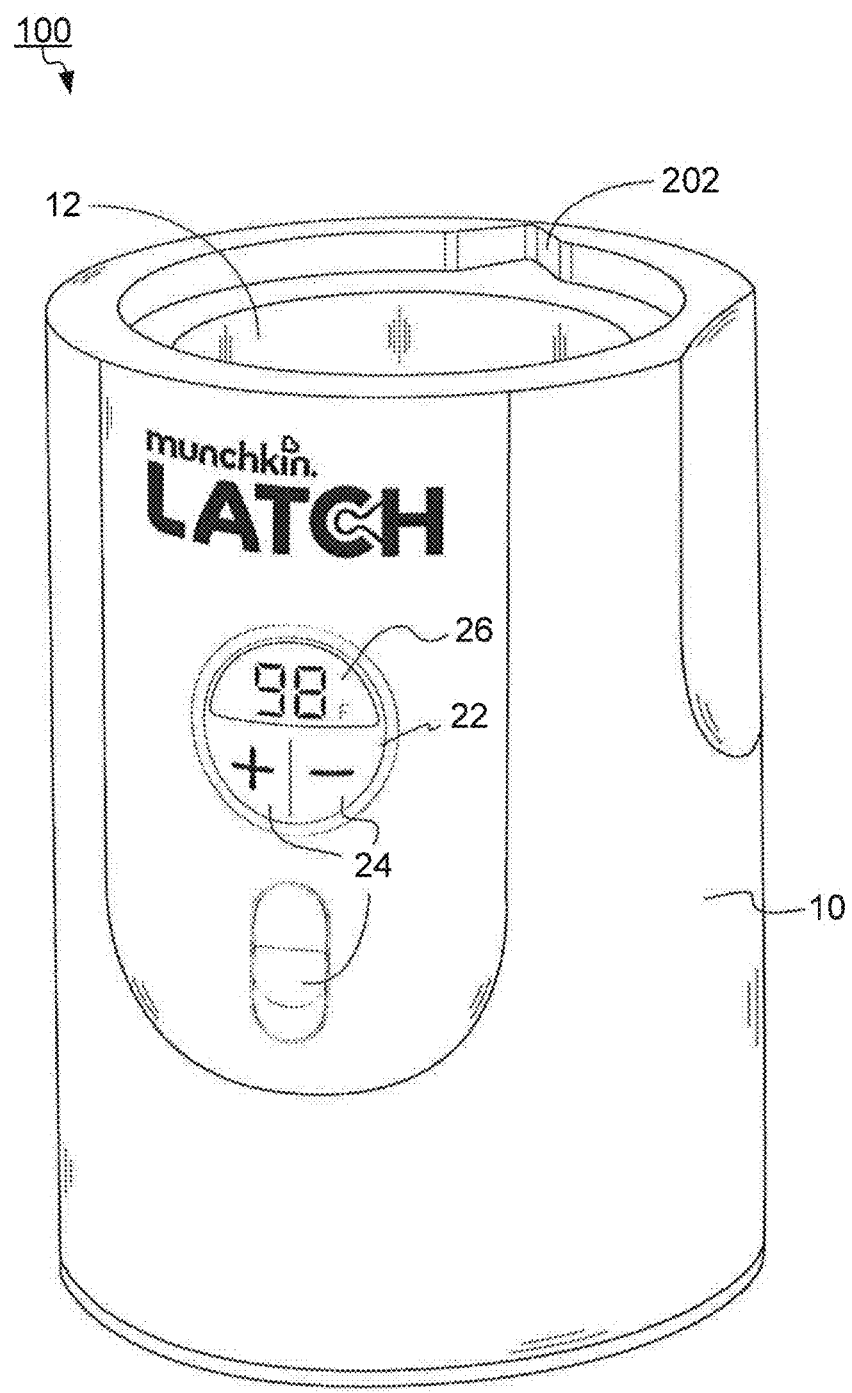
FIG. 8 illustrates a front perspective view of the housing of the warming device and the pouring spout in the upper surface of the housing of the warming device.

As shown in FIGS. 8 and 9, the housing 10 is constructed to provide a recess opening for the warming chamber 12. The warming chamber 12 has a closed lower end and an upward open end. The warming chamber 12 is adapted to hold the fluid reservoir 14 within the walls of the warming chamber 12. A first fluid 61 is received in the reservoir 14. The first fluid 61 is adapted to be heated within the warming chamber 12 to warm a second fluid 62 disposed within the container 60 positioned within the warming chamber 12. The first fluid 61 in the reservoir 14 may be warmed as a heated bath to a substantially elevated hot temperature in which heat is transferred to the second fluid 62 across the walls of the container 60.

Alternatively, and as will be mentioned in more detail below in FIGS. 11-14, steam may be another method used for warming the second fluid 62 within the container 60. That is, the first fluid 61 may be heated to a boiling temperature such that the water changes from a fluid to a gas steam which rises up around the exterior surface of the container 60. The rising steam around the exterior surface of the container 60 causes the temperature of the second fluid 62 to rise and become warm as a result of the heat transfer between the steam from the first fluid 61 to the second fluid 62 across the walls of the container 60.

Figure 15:
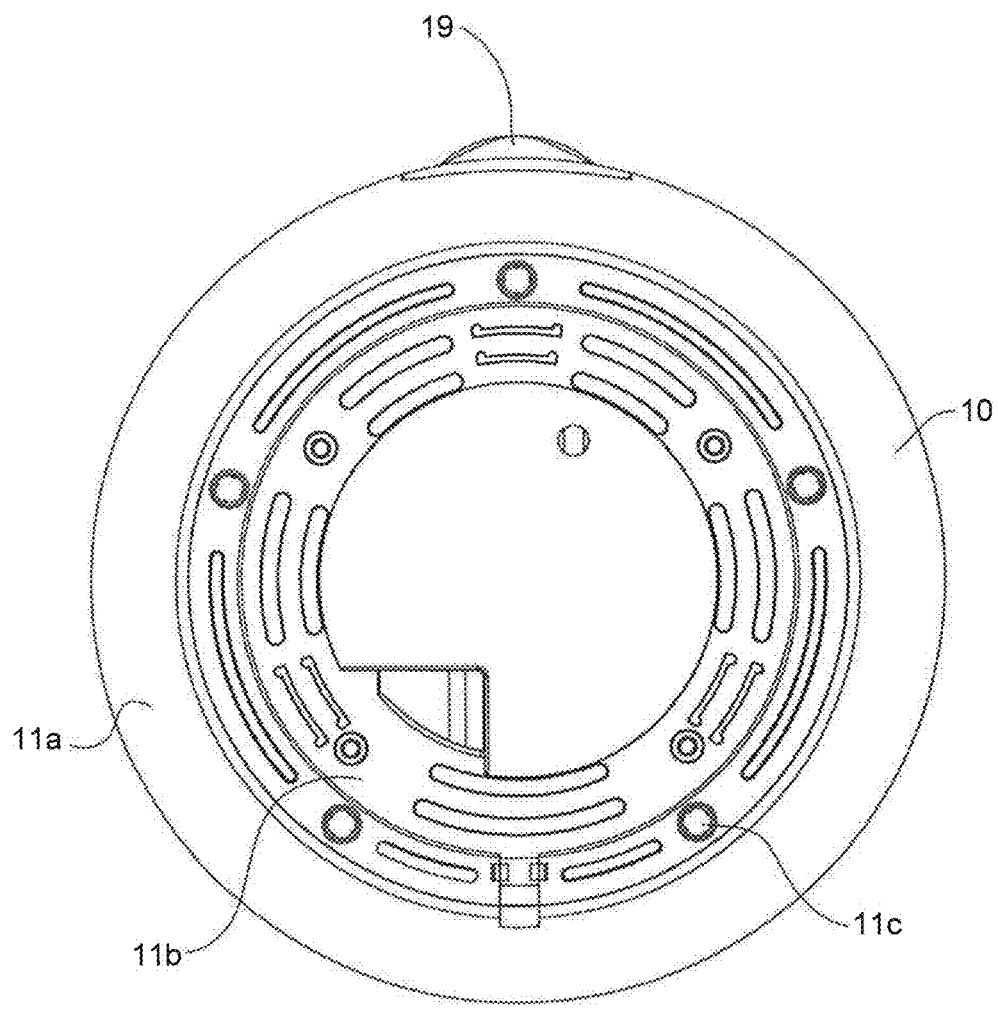
FIG. 15 depicts a bottom view of the warming device.

The housing 10 includes a heating and driving control compartment 200 adapted to receive and house the heating element 30, the motor 40, the ECU 20 and a control panel 22. The housing 10 includes side walls 11a and may include a lower cover 11b (as shown in FIG. 15) adapted to secure and enclose the heating and driving control compartment 200 and the contents therein. Vibration absorbing pads 11c may be positioned on the lower cover 11b to prevent the warming device 100 from vibrating and/or slipping. Although shown as a cylindrical or oval shape, the shape of the housing 10 or the internal compartments thereof may take any size, shape or suitable configuration according to this subject disclosure.

Figure 1:
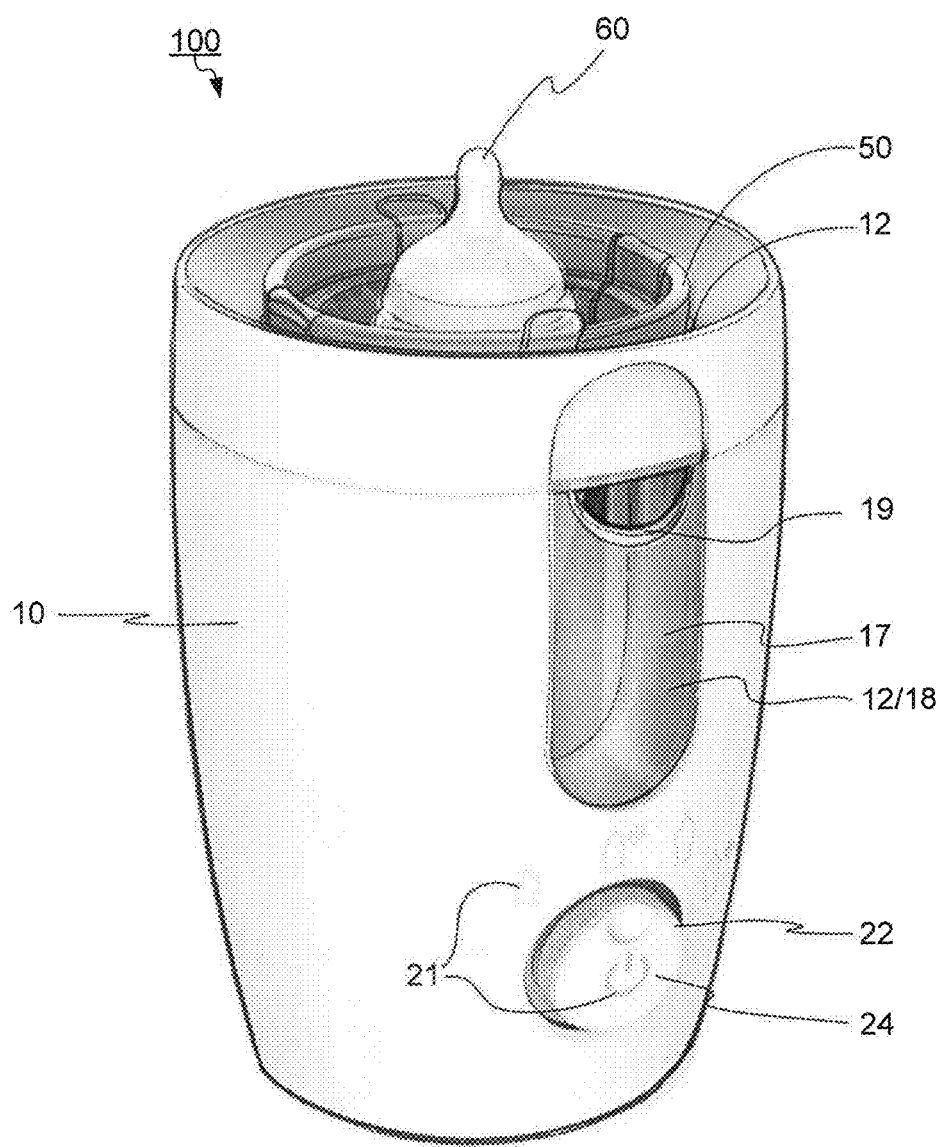
FIG. 1 shows a front perspective view of the warming device with a container placed within the device.
Figure 2:
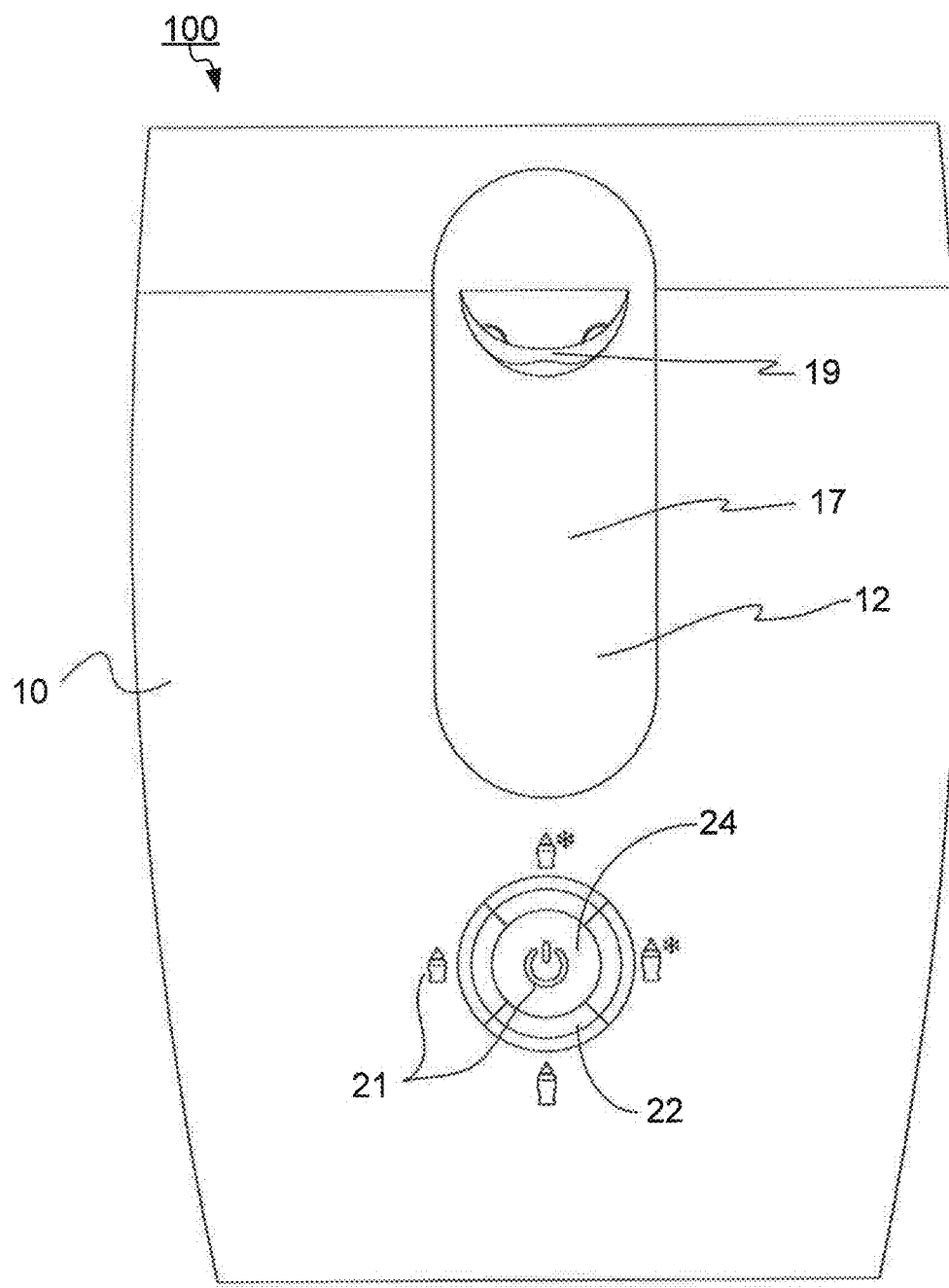
FIG. 2 depicts a front view of the warming device.
Figure 3:
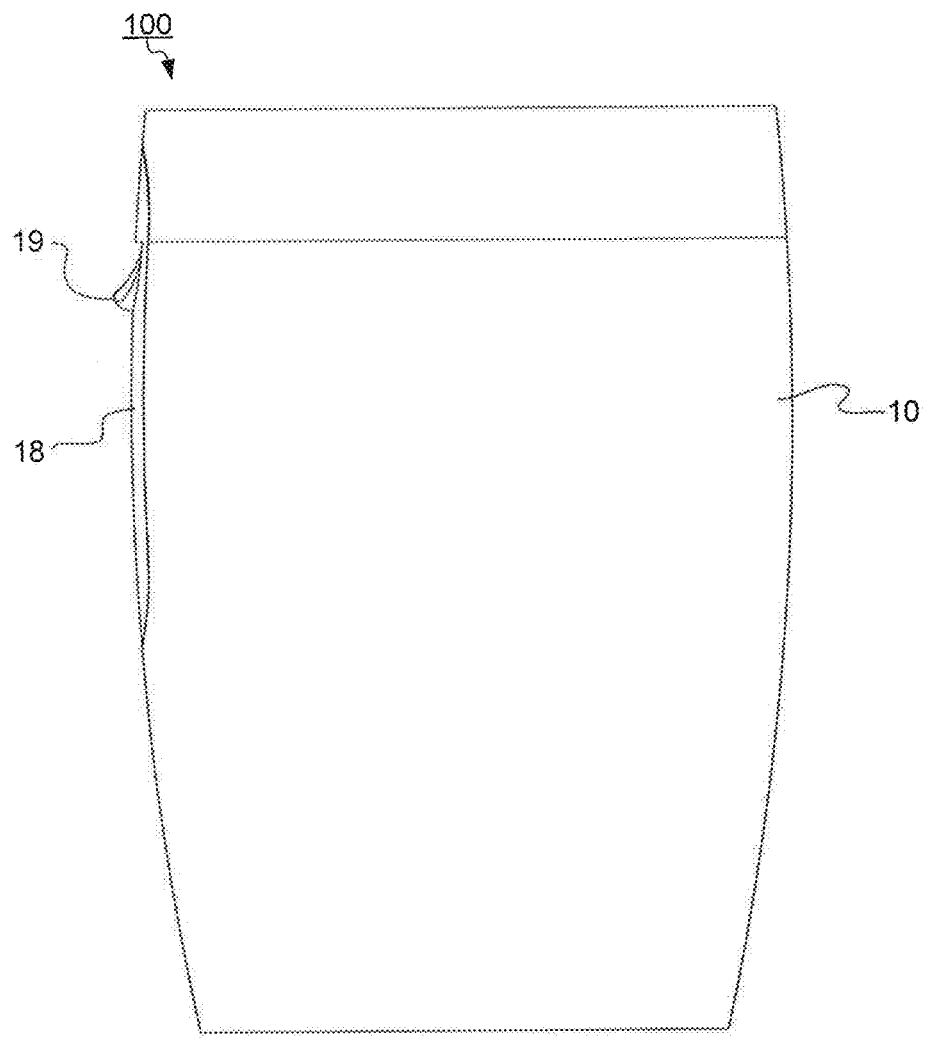
FIG. 3 illustrates a side view of the warming device.
Figure 16:
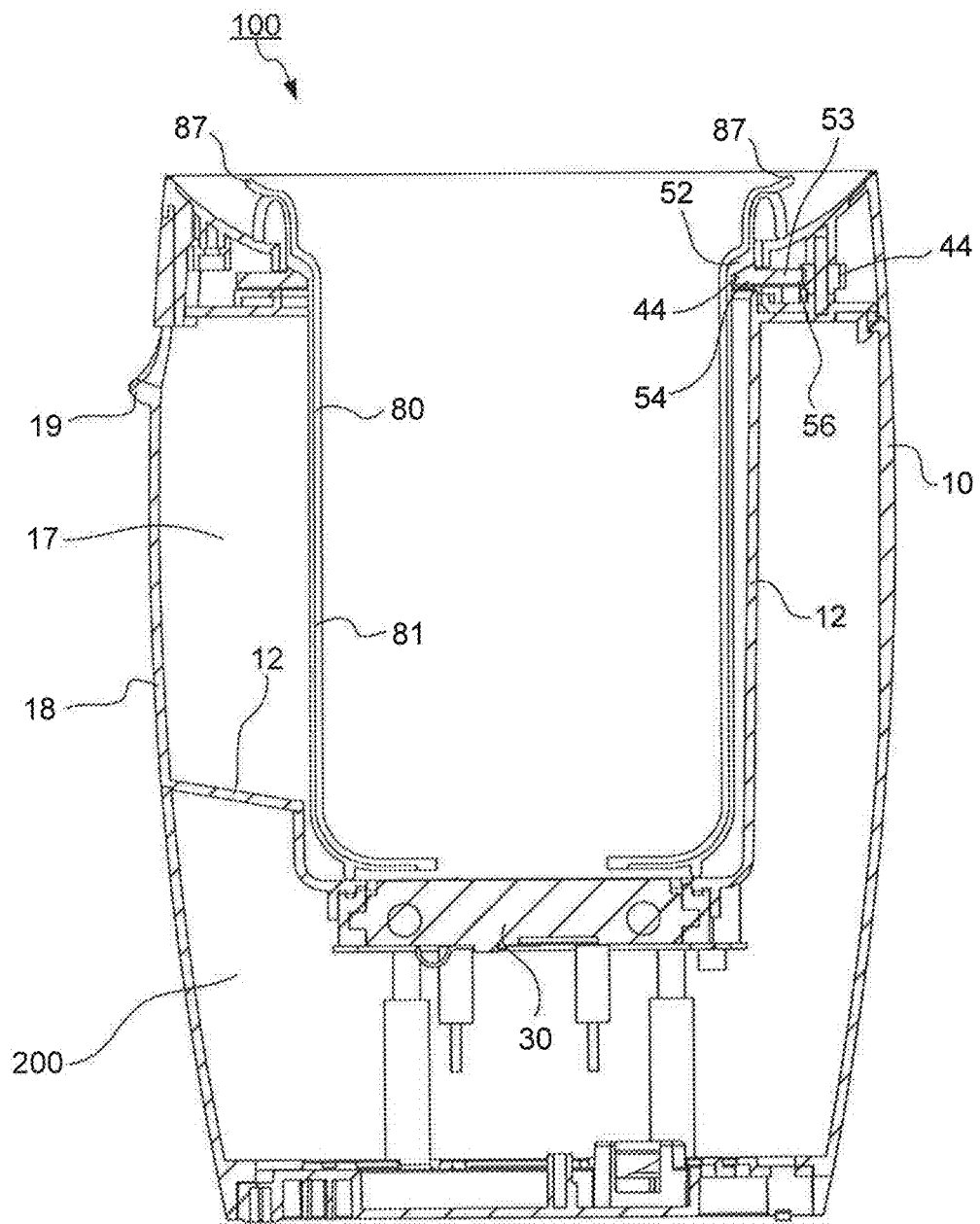
FIG. 16 illustrates the internal warming chamber with a snap locking basket disposed therein.

For example, FIGS. 1 and 16 show the internal warming chamber 12 adapted to receive a basket 50 and a container 60 having a substantially cylindrical shape with an extending lobe 17. The lobe 17 extends above a bottom end of the warming chamber 12 that the basket 50 sits within and an upper end of the warming chamber adjacent to the upper end of the housing 10. The lobe 17 extends radially outward through the housing 10 adjacent to an exterior surface of the housing 10. A translucent cover 18 is provided over the lobe 17 portion of the warming chamber 12. An over flow spout 19 may be provided at an upper end of the lobe 17 for allowing any excess water to spill out of the housing 10 at the over flow spout 19.

The translucent cover 18 provides a dual purpose. In a first instance, the translucent cover 18 allows a user to visually see the level of the first fluid 61 in the warming chamber 12 during operation. Secondly, the user is able to visually observe the reaction condition of the second fluid 62 in the container 60 through the translucent cover 18.

As shown in FIG. 9, the drive mechanism or motor 40 may be selected from a variety of different suitable motors adapted to provide power to a drive shaft 42, which in turn converts the drive shaft power to a rotational force adapted to cause the removable basket 50 to be rotated. As shown, the drive shaft 42 of the motor 40 extends substantially upwardly from the drive mechanism or motor 40 to a location adjacent to the bottom of the warming chamber 12. The drive shaft 42 is connected to the basket 12 by an interconnection mechanism 55 and rotates the basket 12 at a predetermined speed. The rotational speed of the basket 50 can be a predetermined speed based on various presets provided by the various elements 24 on the control panel 22 and/or can be manually provided as desired by an input 24.

The drive shaft 42 of the motor 40 is connected through the lower end of the warming chamber 12 of the housing 10. The connection is made in a fluid tight manner such that the fluid inside of the warming chamber 12 does not leak into the lower heating and driving control compartment 200 of the housing 10. The connection between the drive shaft 42 and the basket 50 may be made in a variety of different ways. For example, the connection may include various interlocking mating projections and recesses, such as a male gear structure driving a female gear structure, or a number of interconnected gears, as will be described in more detail later.

Figure 17:
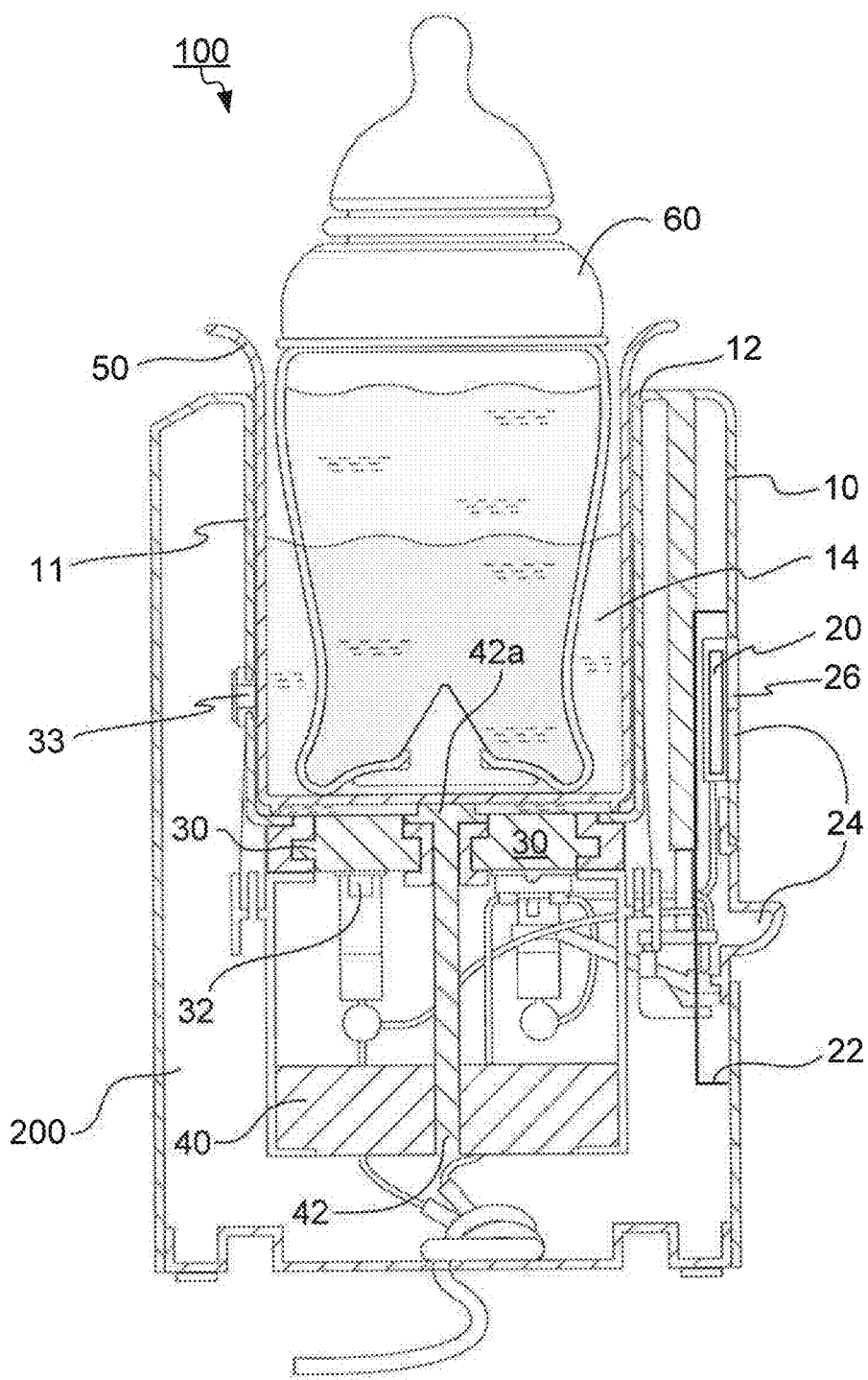
FIG. 17 shows the warming device with a container partially submerged in a warming bath reservoir with a second connection between a heating element and a bottom of the basket.

FIG. 17 depicts another connection between the drive shaft 42 of the motor 40 and the basket 50. As shown, an upper end 42a of the shaft 42 extends into the warming chamber 12 and is interconnected to mate with and rotate the basket 50.

It is to be understood that various connections may be integrated to rotate the basket 50 such as a magnetically biased connection between the motor and the lower part of the basket 50 that does not require a physical connection. In such an arrangement, a magnetically biased portion may be disposed in the lower part of the basket 50 and may be biased to rotate in response to an induction of a magnetic field generated at the motor 40.

Figure 18:
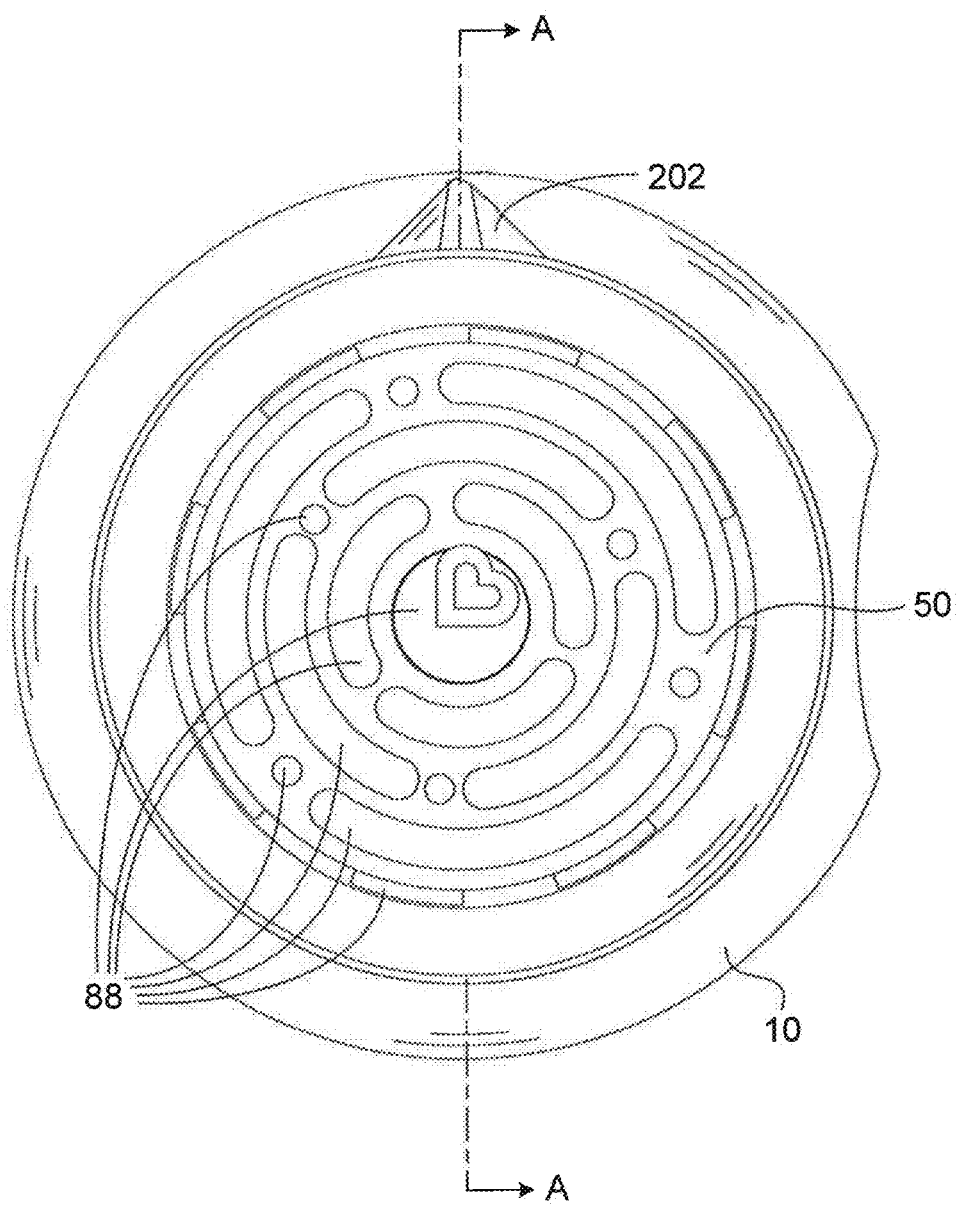
FIG. 18 illustrates a cross section view taken at D-D in FIG. 5 depicting a top view of the warming device with the basket disposed therein.

FIGS. 8 and 18 shows top perspective views of the device warmer 100. As shown, the housing 10 may incorporate a top end spout structure 202 disposed at the upper end of the housing 10 to assist in the pouring of the fluid contents out of the housing 10 once the fluid is to be drained. The spout structure 202 may be constructed at the top end of the housing 12 or in another location near the top end of the housing 12. Likewise, a handle (not shown) may be integrated into the housing 10 in order to more securely manipulate the housing 10 and the contents in the warming device 100.

The housing 10 may be sealed in a variety of different ways. For example, various gaskets may be used throughout the housing 10 to seal the lower heating and driving control compartment 200 of the housing 10 from the fluids in the warming chamber 12, and/or any other component requiring sealing according to the subject disclosure. The various gaskets and/or seals may be formed of rubber, and/or any material or process suitable for producing a watertight seal.

Figure 19:
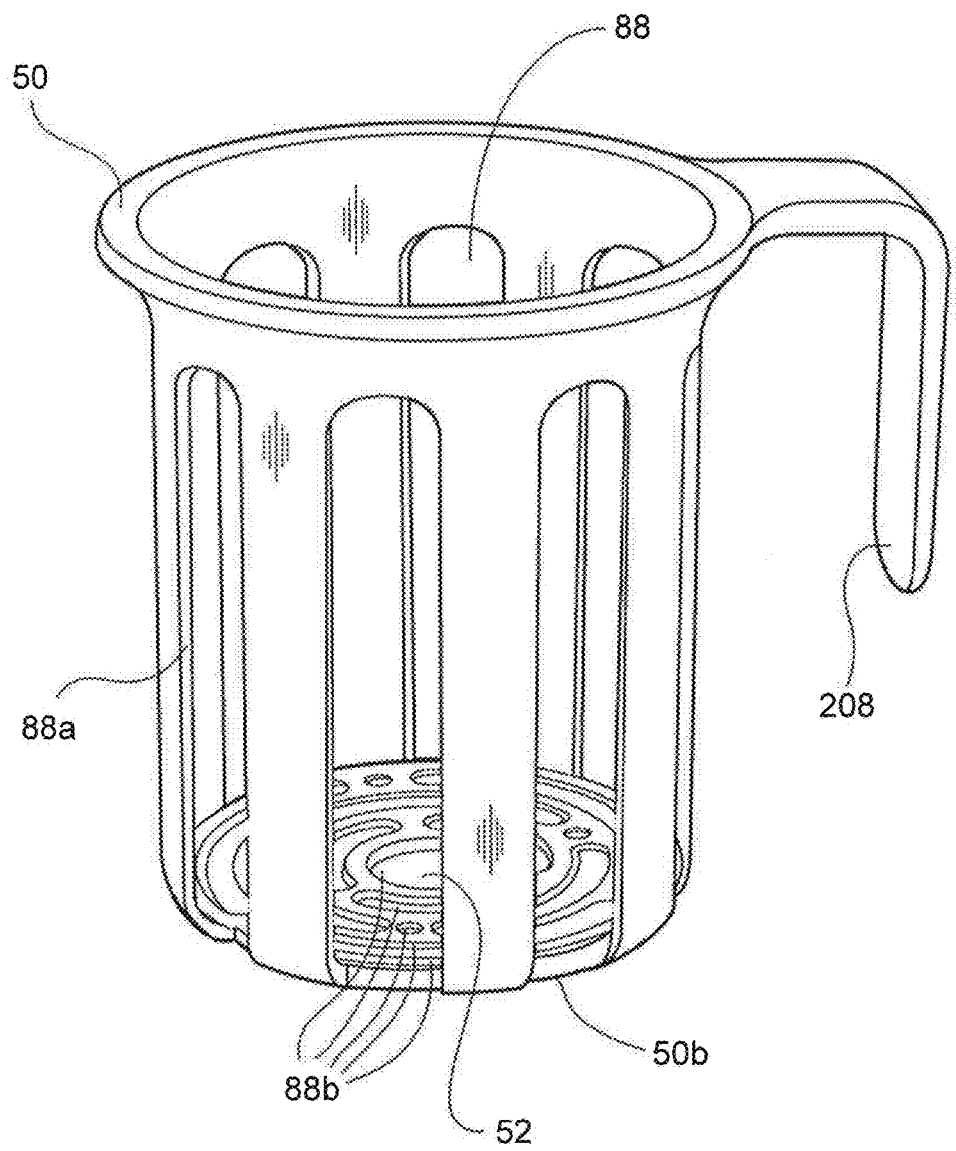
FIG. 19 depicts a front perspective view of the basket with a handle showing the grates, vents and perforations in the body of the basket to allow the warming fluid to penetrate across the basket housing.

FIG. 19 shows the removable basket 50 being generally cylindrical. The removable basket 50 has an interconnecting mating element 52 adapted to connect to, and be secured to, the drive shaft 30 in order to rotate the removable basket 50 while in use in use. The interconnecting mating element 52 is one part of a mating component in an interconnection mechanism 55 between the shaft 42 of the motor 40 and the basket 50 which will be described in more detail later. It is to be understood that the mating element 52 may be constructed in various places on the removable basket 50.

The removable basket 50 may include a handle 208 suitable for safely lifting the basket 50 and container 60 into and out of the housing 10 of the warming device 100. The handle 208 may extend outward from an upper region of the basket 50. As shown in FIGS. 18 and 19, the removable basket 50 may include a plurality of vent holes 88, perforations, ports or the like to allow the first fluid 61 and/or steam from the first fluid 61 to pass through the holes 88 in the basket 50 and collect adjacent to the outer surface of the container 60 in order to transfer heat from the first fluid 61 to the second fluid 62 inside of the container 60.

In an alternative embodiment, the removable basket 50 may also be comprised of a stationary portion and a separate, rotating portion (not shown). In use, the stationary portion may remain in a rotationally fixed position with the handle 208 being attached thereon. The rotational portion of the basket 50 would then be engaged by the drive shaft 42 and would rotate the container 60 by the rotational portion of the removable basket 60.

Figure 20:
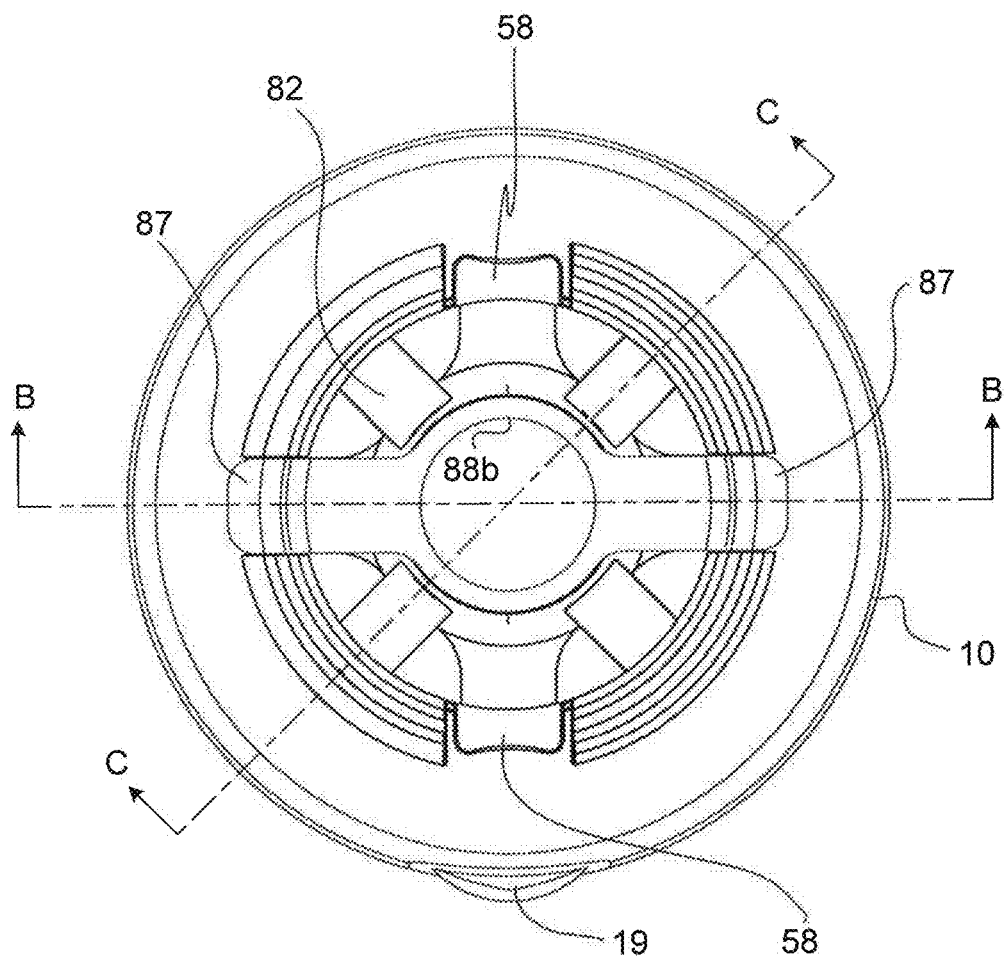
FIG. 20 shows a top view of another embodiment of the warming device with the snap locking basket disposed therein.
Figure 21:
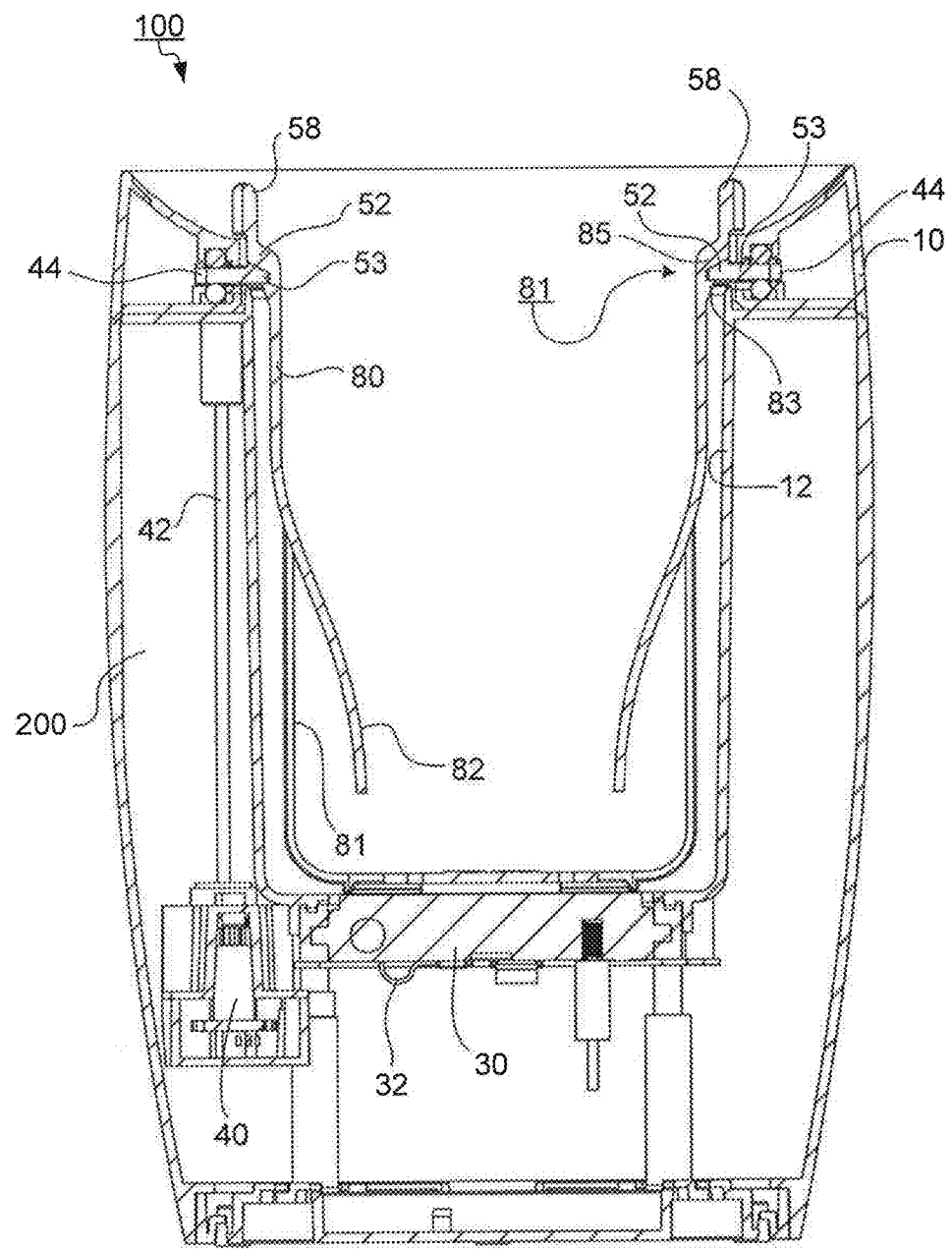
FIG. 21 depicts the warming device with another arrangement for the motor and heating element disposed therein.
Figure 22:
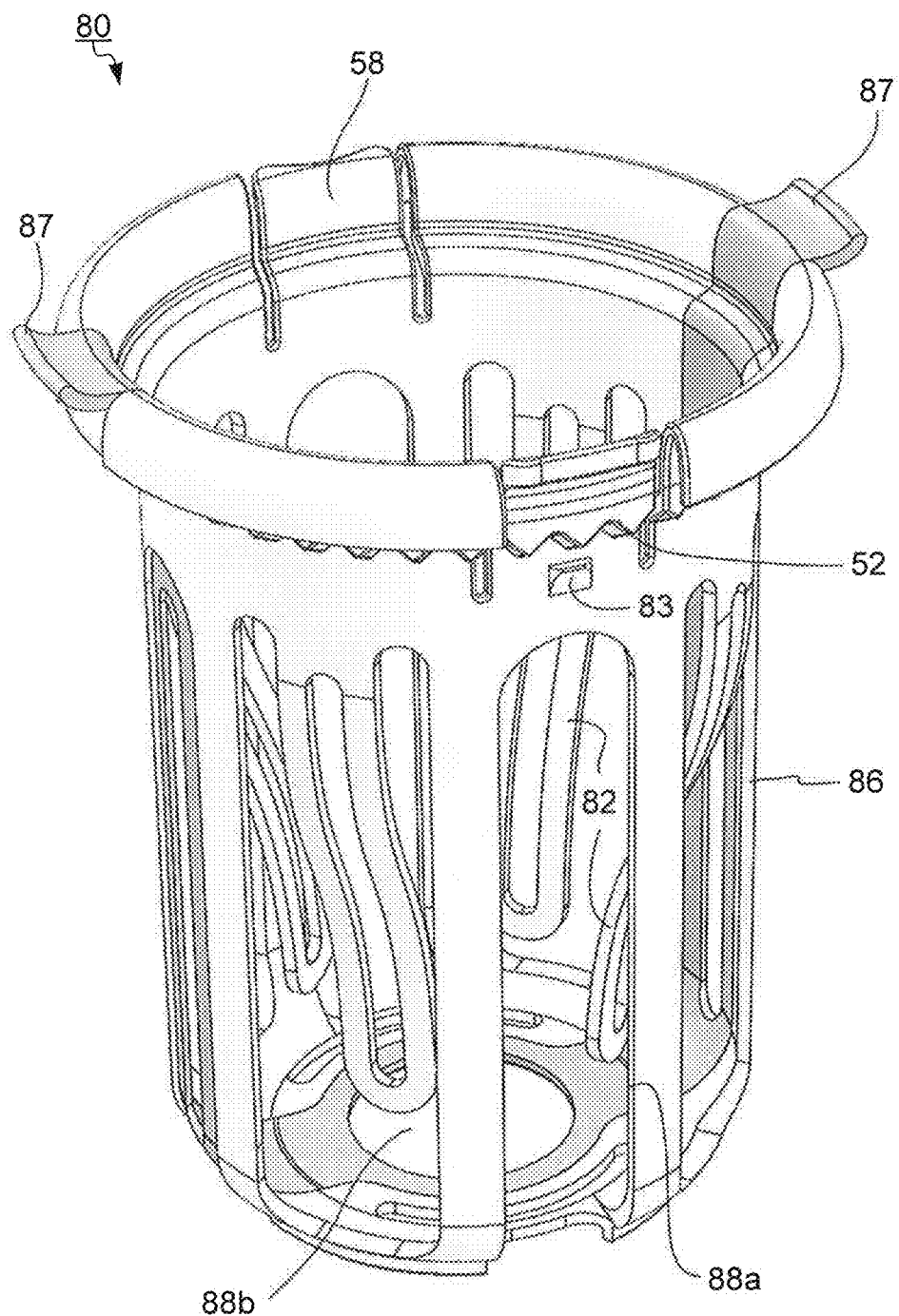
FIG. 22 illustrates a front perspective view of the snap locking basket, showing the inwardly depressing tabs and handles.

Alternatively, FIGS. 16 and 20-22 show the removable basket may be embodied as a removable snap-fit basket 80. The snap-fit basket 80 includes a generally cylindrical outer surface 86 having a plurality of inwardly extending ribs 82. As shown in FIGS. 20-22, the extending ribs 82 are inward biased and adapted to restrictively flex outward in order to grab the outer surface of the container 60 between the inward biased ribs 82 and secure the container 60 via a friction fit.

Figure 23:
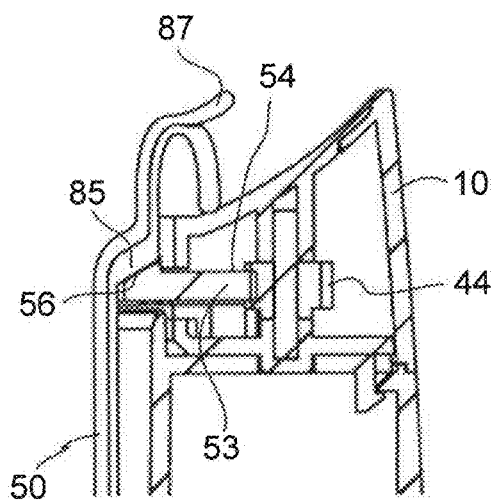
FIG. 23 shows an expanded view of the upper corner of the snap locking basket and housing of the warming device.
Figure 24:
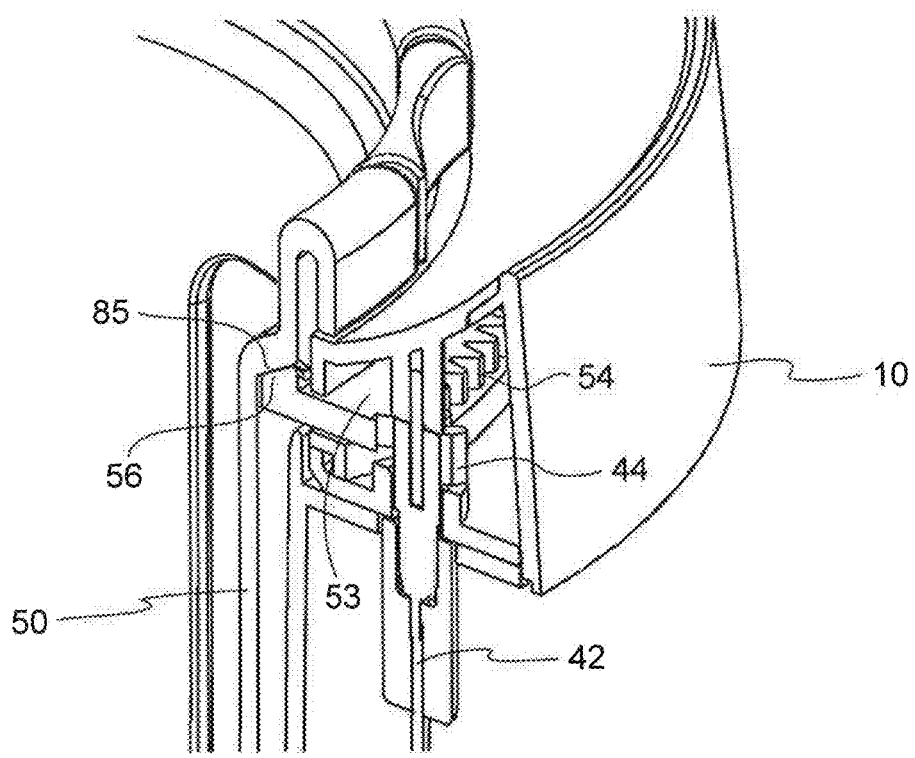
FIG. 24 depicts the interconnection between the motor and the snap locking basket.

As shown in FIGS. 21 and 23-24, the upper end of the snap-lock basket 80 is interconnected with the housing 10 via a snap lock mechanism 81. The snap lock mechanism 81 includes a sloped undercut projection 83. In position, the basket 80 is inserted into the warming chamber 12 and pushed down over a mating intermediate gear 53 that projects outward into a space disposed between the sloped undercut projection 83 and slave gear 85.

FIGS. 23-24 better illustrate the interconnection mechanism 55 between the motor 40 and the basket 80. That is, a first drive gear 44 on the drive shaft 42 mates with a first geared end 54 of the intermediate gear 53. A second geared end 56 of the intermediate gear 53 mates with the slave gear 85. In operation, the first drive gear 44 drives the slave gear 85 through the intermediate gear 53.

Referring to FIGS. 21-22, once the snap lock basket 80 is locked into place, the snap lock basket 80 may be removed. The tabs 58 are inwardly depressed so that the teeth on the slave gear 85 are disengaged from their mating position with mating teeth on the intermediate gear 53. Likewise, the projection 83 on the basket 80 is depressed inward to allow the first geared end 54 of the intermediate gear 53 to overcome the projection 83 and become disengaged from the warming chamber 12.

Handles 87 are provided on the basket 80 to allow a user to conveniently grab onto and withdraw the basket 80 from within the warming chamber 12. The handles 87 may be constructed to extend outward from an upper lip of the basket 80 outward into projecting handles 87.

As before, various holes or perforations 88 are disposed about the basket 80 in order to allow the first fluid 61 to pass from the warming chamber 12 across the basket 80 and to the outer surface adjacent to the container 60. Elongated perforations 88a may be selectively located around the cylindrical length of the basket 80. Perforation(s) 88b may be disposed at a bottom of the basket 80, and/or any other suitable location to allow the easy flow of the first fluid 61 in the warming chamber 12.

The warming chamber 12 is generally constructed to contain the reservoir 14 for holding the first fluid 61 that is to be heated. Likewise, the basket 50 is adapted to be received within the structure of the warming chamber 12 and allowed to rotate the container 60 therein as it is rotated by the motor 40. An exemplary second fluid 62 being warmed in the container 60 may be refrigerated breast milk that was previously expressed and refrigerated for later use. Ideally in use, the breast milk will be heated to approximately 98.6 degree to mimic the temperature of the milk expelled from the mother's breast.

Referring to FIG. 9, the warming chamber 12 may also include thermostats 32, 33 that are adapted to detect the temperature of the first fluid 61 within the reservoir 14 and to relay that data information to the ECU 20. A seal may be provided in between the thermostat 33 and a surface of the warming chamber 12 to prevent leakage of the first fluid 16. The thermostat 33 may be located on a wall or base of the warming chamber 12, or at any suitable location which would provide enough surface contact between the first fluid 61 in the warming chamber 12 and the thermostat 33 to adequately measure the temperature of the first fluid 61.

As illustrated in FIG. 10, the container 60 may be selected from various sizes, materials and shapes. The container 60 may be in the form of a glass or plastic baby jar, and/or other material container or fl. oz. baby bottle, or any other container with a generally cylindrical body containing fluid to be heated and agitated. Furthermore, the container 60 may have any height without placing the user in danger of coming into contact with the fluid in the warming chamber 12. In use, the user may remove the basket 50 containing the container 60 from the warming chamber 12 by contacting the basket 50 without directly coming into contact with the hot warming chamber or heated portions of the container itself.

As depicted in FIGS. 5, 8-9 and 17 the electronic control unit (ECU) 20 is connected to the control panel 22, the heating element 30, the motor 40, a power source and thermostats 32, 33. The control panel 22 comprises various input/output device elements 24 and a display 26, as depicted in FIGS. 1-2, 5 and 8.

The ECU 20 may be a microprocessor including control circuitry adapted to control the amount of heat provided to the first fluid 61 in the reservoir in order to heat the first fluid 61 to a predetermined elevated temperature. In one instance, the first fluid 61 may be heated to a predetermined first heated bath temperature. In a second embodiment, the first fluid 61 may be heated to a second temperature in order to produce a heated steam to steam the outer surfaces of the container 60 provided in the warming chamber 12 within the housing 10. Likewise, the control circuitry of the ECU 20 may be adapted to control the speed of the rotation of the basket 12 as a result the heat transfer from the heating elements 30 across the warming chamber 12 to an outer surface of the container 60 as will be described in more detail.

The ECU 20 may control the various parameters surrounding the speed of the rotation of the container 60 in the basket 50. The rotational revolutions per minute (RPM's) may be preferably selected to optimize and improve the heating efficacy and mixing of the fat (lipids) back into the breast milk. Exemplary RPM's based on a spinning duration may be approximately: 2 minutes, 30 seconds for a 4 oz bottle; and 3 minutes, 30 secs for an 8 oz bottle. According to one exemplary aspect of the subject disclosure, the fat in the breast milk combines with the remainder of the breast milk solution between about 120 RPM's and 400 RPM's. The container 60 is positioned within the basket 50 in the warming chamber 12 and rotated at a predetermined RPM to maintain a smooth centrally located on-center, center-of-gravity which facilitates the stability of the warming process. Depending on the second fluid in the container being warmed and the first fluid in the warming chamber, other suitable RPM ranges may be selected depending on the viscosity and other material warming properties of the fluid contained within the container 60.

The electronic control circuit (ECU) 20 is connected to at least a first thermostat 32. The thermostat 32 is adapted to detect and provide data information back to the ECU 20 to control the temperature of the heating element 30. The thermostat 32 may be located on an underside of the heating element 30 as shown in FIG. 9, or on a side wall (such as shown in element 33), on a top surface of the heating element 30 or any other suitable location to detect the temperature of the heating element 30.

The ECU 20 may include a timing circuit for various purposes. That is, the timing circuit may be provided as a predetermined timer to monitor the time it takes to warm the bottle and/or a predetermined set time that the first fluid 61 is to be warmed until it reaches a threshold temperature. The timing circuit may also be provided as an automatic warmer at predetermined times. Various timing features and timing intervals may be controlled by the control circuitry of the ECU 20 for the heating of the first fluid 61 in the reservoir 14 and rotating the basket 50 in the housing 10.

The timing circuit may be adapted to provide instructions to the ECU 20 to stop the heating element 30 and/or the motor 40 in various ways. The timing circuit may be connected between the power source and both the heating element 30 and the motor 40, and thus capable of interrupting the power source from receiving transmitted electrical signals to power on the heating element 30 and/or the motor 40. In addition, the timing circuit may be connected to one of the various input/output elements 24, which in turn can also control the power being supplied to either the heating element 30 or the motor 40.

The ECU 20 may also have an audible alarm to give an auditory feedback at various stages along the heating and agitating process. A speaker may be located within the housing 10 to play the audible alarm. The alarm may comprise various sounds and volumes to distinguish the different stages, which may encompass the start of the warming device 100, indication of different percentages completed, a cool-off period, a completed position, etc.

The ECU 20 may also include and control various color lights 21 (such as in FIG. 2) to indicate the various stages and/or various parameters associated with the warming device 100. Different color lights could represent different cycles, cold, warming, complete, danger, etc. The lights may be light emitting diodes (LED's) or other suitable lighting sources.

The microprocessor in the ECU 20 of may include an internal memory to store procedures specific to the type of fluid warming process to be applied, and in combination with the composition of the container to be warmed. The settings may be used for automatically starting a predetermined schedule including raising the temperature of the heating element 30 to a specific temperature, rotating the container 60 to a specific angular velocity and acceleration pattern, shutting down the motor 40 and/or heating element 30 after a predetermined amount of time, and/or any other setting which may be altered by the user during the agitation of the container 60. Additionally, the control circuitry of the ECU 20 can allow a user to create custom settings for the container warming process.

Figure 5:
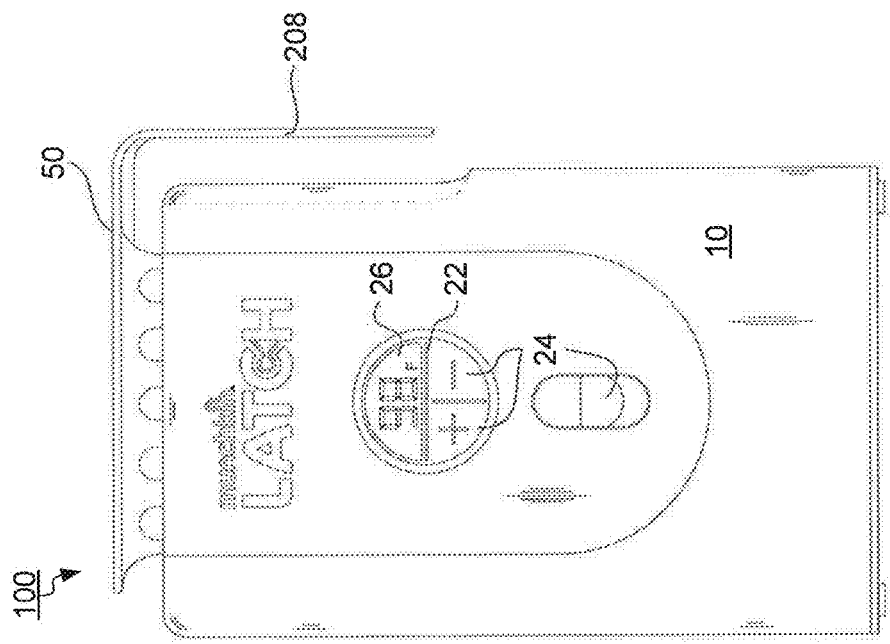
FIG. 5 illustrates a front view of the control panel of the warming device with the basket placed within the warming chamber.
Figure 4:
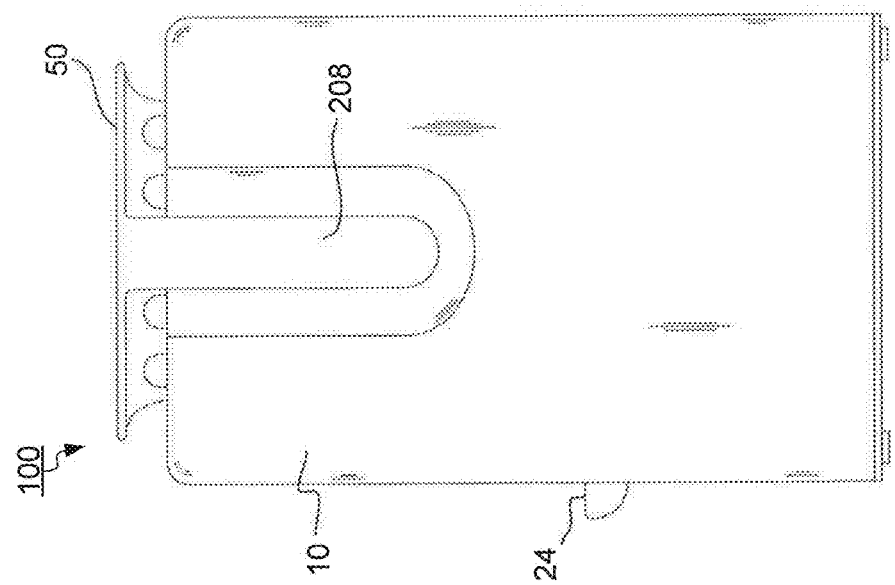
FIG. 4 shows a side view of the warming device with a handle connected to the basket.
Figure 7:
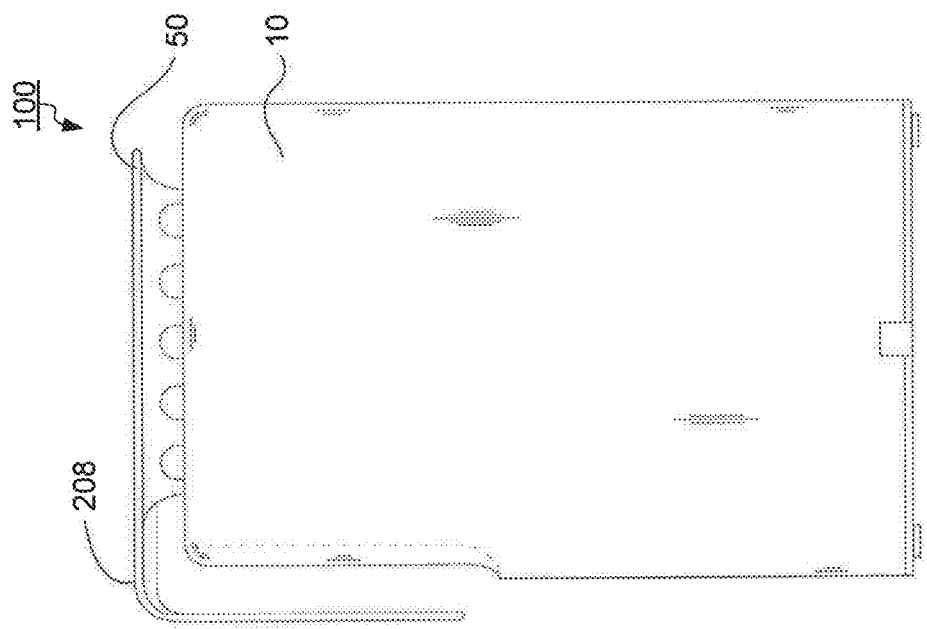
FIG. 7 shows a rear view of the warming device with the basket placed within the warming chamber of the warming device.
Figure 6:
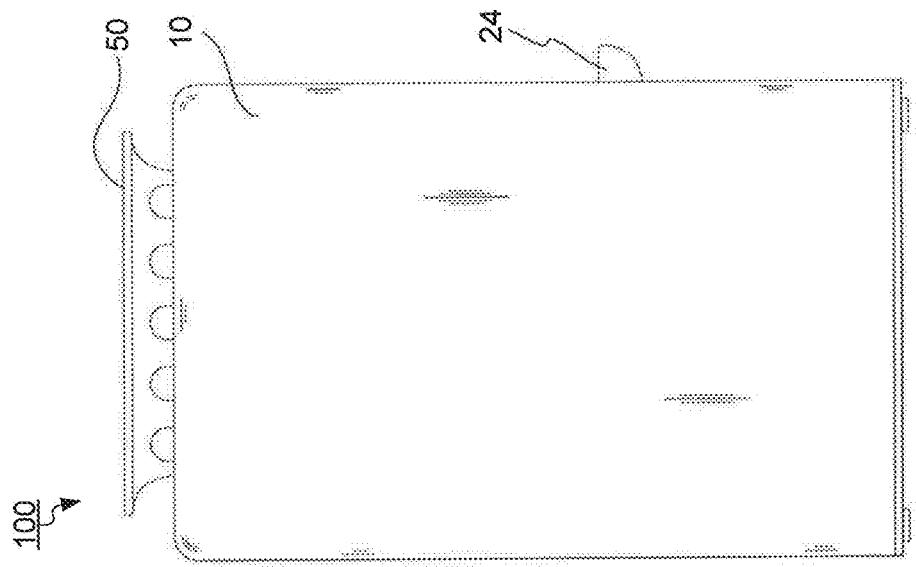
FIG. 6 depicts a rear side view of the warming device the basket disposed within the warming chamber of the warming device.

As shown in FIGS. 5 and 8, the control panel 22 may include various activation elements 24 and a display 26. The display 26 may be a liquid crystal display (LCD) and/or any other suitable medium for providing a display for a user. The display 26 may provide the user information such as the temperature of the fluid or steam within the warming chamber 12, the temperature of the heating element 30, the rotation speed and pattern of the motor 40 and the container 60, amount of time remaining of the timing circuit, amount of time the container 60 has been heated, various error codes or warnings, as well as various other customized or predetermined settings.

The input/out device elements 24 may include various buttons to control the operation of the ECU 20 in the warming device 100. The input/out devices 24 in the warming device 100 are electronically connected to control circuitry of the ECU 20 in order to control the heating of the fluid and the rotation of the basket 50. The input/out device 24 may be a knob, a switch, a sliding or depressing button, a display, a touch-screen display and/or any other type of input or output device capable of receiving or generating instructions and/or other information according to this subject disclosure.

The heating element 30 is electrically connected to the thermostat 32 and the ECU 20 in order to control the heating element 30. The heating element 30 may be positioned within the housing 10 and positioned below the warming chamber 12 to heat the first fluid 61 held within the reservoir 14. The heating element 30 may also be located in a variety of different locations to warm the first fluid 61 within the reservoir 14 of the warming chamber 12.

As shown in FIG. 9, the heating element 30 is located below the base of the warming chamber 12. The heating element 30 raises the temperature of the warming chamber 12, thereby causing the warming chamber 12 to heat the first fluid 61 held within the reservoir 14. FIG. 17 shows an alternative configuration in which the heating element 30 is in direct contact with the first fluid 61 and thus directly heats the first fluid 61. Here, the housing 10 may be provided with another sealing element disposed between the warming chamber 12 and the heating element 30 to further prevent the first fluid 61 from leaking out of the reservoir 14 in the warming chamber 12. As will be discussed later, the heating elements 30 may be constructed to be positioned along various other locations in the housing 10 such that the drive shaft 42 from the motor 40 and the heating elements 30 in the lower component compartment are not co-located as will be shown and described later in FIGS. 25-26. The heating element 30 may be any heating device suitable for heating the first fluid 61 in the reservoir 14 and/or converting the first fluid 61 into a heating vapor.

FIGS. 11-14 illustrate the warming process in which the first fluid 61 is converted into a steam. According to this subject disclosure, the first fluid 61 may be water which may be heated by the heating element 30 until it evaporates into a steam vapor. The heated vapor rises upward from the liquid reservoir 14 upward along the outside surface 62 of the container 60. The heat from vaporized first fluid 61 convects across the outer surface 62 of the housing 10 of the container 60 and into the second fluid 62 contained therein.

The heating element 30 may include one or more fuses in its circuitry which can serve as safety devices. The safety fuses can open and activate a safety protocol at any suitable threshold temperature. The temperature for each fuse can be determined anywhere in the warming device 100 such as anywhere in the base housing 10 or the container 20. The warming device 100 can also include one or more safety switches (not pictured) which can prevent operation of the warming device 100 if the housing 10 is not properly mounted on a flat platform, or if basket 50 or container 60 is not properly placed within the basket 50.

Figure 35:
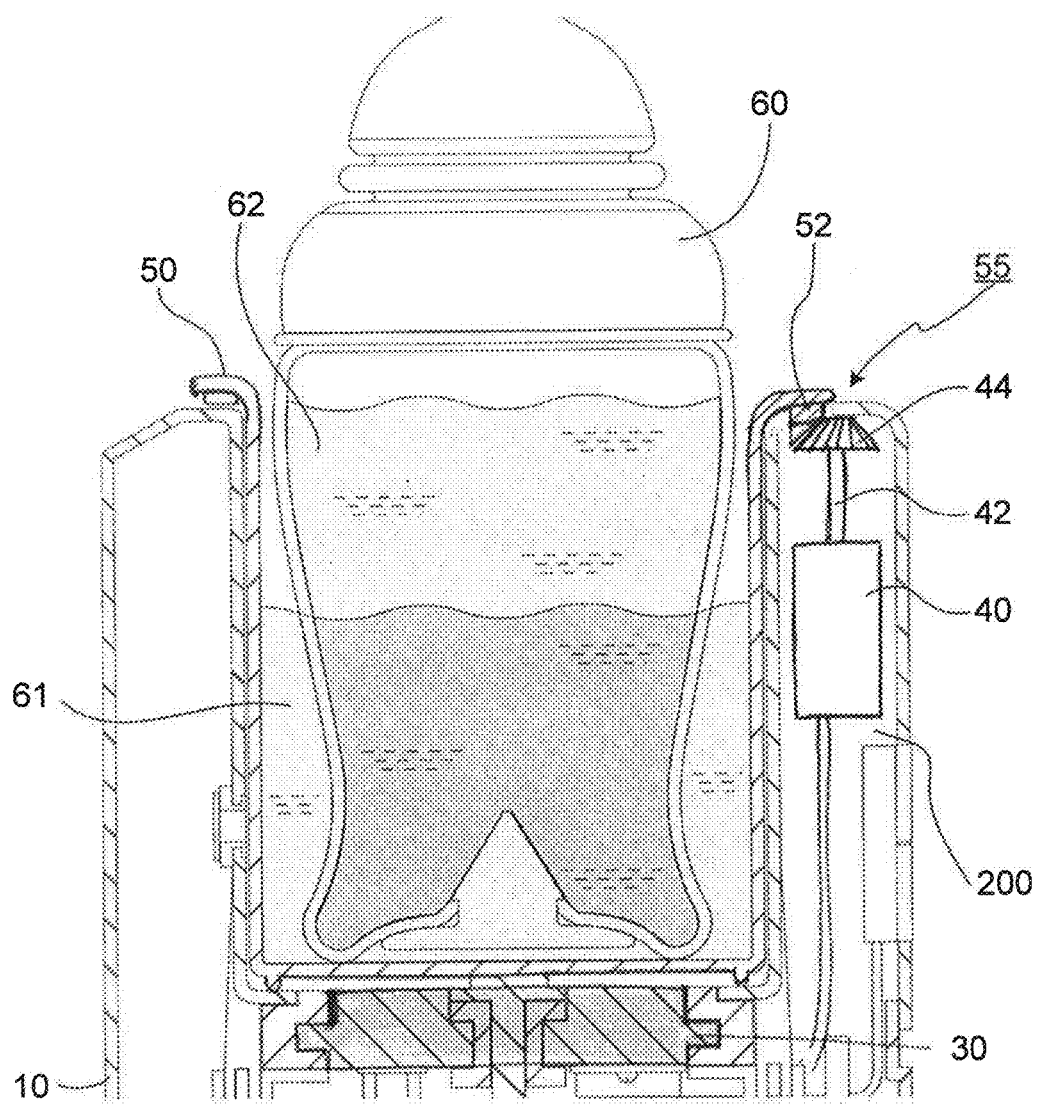
FIG. 35 depicts another exemplary construction in which the motor and drive shaft are interconnected for rotation at a position adjacent to the upper end of the basket.

The motor 40 is electrically connected to the ECU 20 and is adapted to control the speed and direction of rotation of the basket 50 within the warming chamber 12. The interconnection mechanism 55 is provided between the shaft 42 of the motor 40 and the basket 50 that cooperates to rotate the basket 50. Various interconnections may exist between the shaft 42 and the basket 50. One example would be to include a drive gear 44 at the end of the shaft 42 of the motor, and a slave or driven gear 52 on the basket 50. The slave gear 52 incorporated in a variety of different positions, for example around an outer surface of the basket 50, such as shown in FIG. 35. As shown, the motor 40 is positioned within the inner compartment 200 of the housing 10 such that the drive gear 44 of the drive shaft 42 engages a mating slave gear 52 connection on the basket 50.

In one example, and as shown in FIG. 9, the drive shaft 42 and the motor 40 are provided at the bottom of the warming chamber 12 and directly below the basket 50. The drive shaft 42 and the motor 40 are matingly interconnected by a mating connection between the end of the shaft 42 and the basket 50 to permit the drive shaft 42 to rotate the basket 50 while in use.

The drive shaft 42 of the motor 40 may be controlled to move at a variety of different speed and directions and is not limited to rotation in any particular direction and may turn in a clockwise or counter-clockwise direction at different times and/or in a back and forth fashion and/or at various rates of speed or patterns of movements, albeit in a gentle controlled manner to preserve the protein and nutrients in a women's natural breast milk.

For example, the motor 40 may be controlled by the ECU 20 to move in a first direction, a second opposite direction or in a back and forth position. The drive shaft 42 may move in a gentle stuttered movement, such as by starting and stopping the drive shaft 42 forward intermittently. The advantage to being able to manipulate the control of the drive shaft 42 is to be able to gently agitate the first fluid 61 within the container 60 so that the concentration of second fluid 62 at the center of the container 60 may be moved outward to the outer surface ends or edges of the container 60 adjacent to the outer surface 62 wall of the container 60, close to the heat being convected in across the boundary surface 62 of the wall of the container 60. The transfer of heat across the outer surface 62 wall from the reservoir bath first fluid 61 to the adjacent second fluid 62 in the container 60 is greater as the two fluids are in close proximity to each other. The gentle agitation from the rotation of the basket 60 allows for the second fluid 62 concentration at the center of the container 60 to move closer to the container surface 62 of the container 60 adjacent to the reservoir first fluid 61 in a consistent and uniform manner.

The warming device 100 may agitate the second fluid 62 within the container 60 in a variety of ways. The warming device 100 may rotate the container 60 at a predetermined rate of movement to translate movement of the container 60 to the second fluid 62 to cause the agitation and subsequent mixture of the solution within the second fluid 62. The predetermined rate may be constant or variable. The rate may also be stuttered by oscillating the revolution between a first, gentler higher angular velocity and second, lower or zero angular velocity. The warming device 100 may also switch the direction of rotation of the container 60 back and forth from rotating counter-clockwise to clockwise and vice versa. The container 60 may also be agitated in any other suitable gentle fashion according to the subject disclosure.

In the alternative, a pump (not shown) may be provided in the housing 10 connected to the motor 40 and adapted to provide a gentle water-driven type turbine to rotate the basket 50. That is, the pump may direct a jet stream of the reservoir first fluid 61 to impact a surface, such as a blade or impeller shape flat ridge, on the basket 50 in order to cause the basket 50 to rotate. The jet stream of the reservoir first fluid 61 may be provided through an outlet port of a nozzle-like structure being ejected from an outlet of the pump. The jet stream may be projected tangentially against the blade surface of the basket 50 to cause the basket 50 to rotate.

The pump may be electrically connected to the motor 40 and the ECU 20 and adapted to receive instructions from the ECU 20 which instruct the motor 40 and the pump on a predetermined amount of force behind the fluid flow to project the fluid against the outer surface of the basket 50 in order to control the speed at which the basket 50 will rotate under the pressure of the directed first fluid 61 flow. The first fluid 61 may be directed to impart its stream of the first fluid 61 from the nozzle at an angle that is substantially perpendicular to a radial length of the basket 50.

Figure 27:
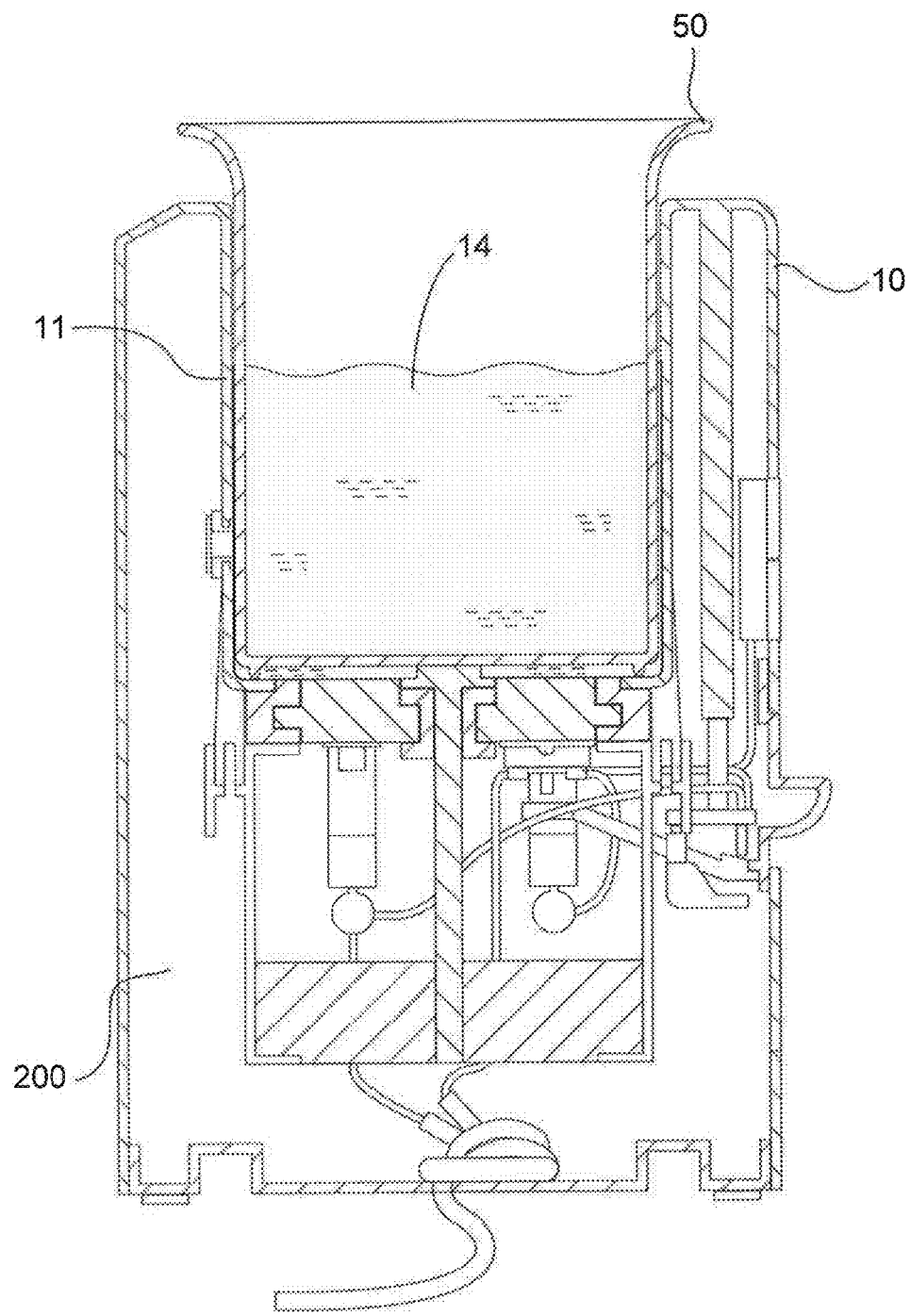
FIG. 27 shows the first step of the warming process in which a first fluid is filled into the warming chamber of the housing.

FIGS. 27-31 illustrate an exemplary method of agitating and warming a second fluid 62 in a container 60 with a warming device 100 by heating a first fluid 61 to a heated bath in a reservoir 14. FIG. 27 illustrates a first step in which a first fluid 61 is filled into a reservoir 14 of a warming chamber 12 of the warming device 100.

Figure 28:
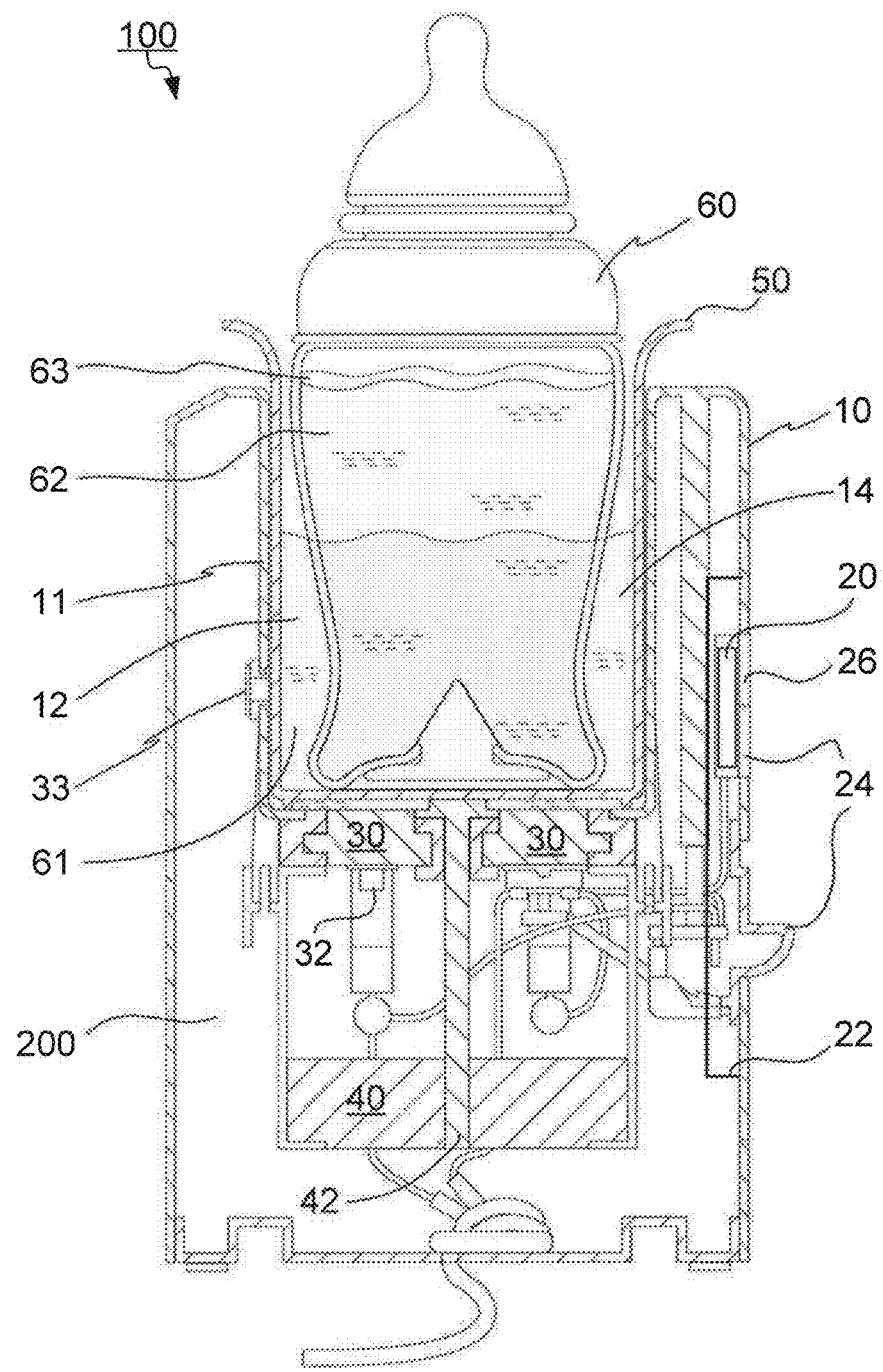
FIG. 28 illustrates a second step in which the container is positioned into the basket and submerged into the first fluid provided in the warming chamber.

In a second step as shown in FIG. 28, a container 20 is positioned into a basket 50 and submerged into the first fluid 61 provided in the warming chamber 12. The heating elements 30 are activated and the first fluid 61 may be gradually warmed to a predetermined temperature. Simultaneously, a motor 40 is initiated and a drive shaft 42 is interconnected with the basket 50 to drive a rotation of the basket 60.

Although various containers may be used, the exemplary container used is shown herein is an infant bottle and the second fluid 62 is a breast milk. The motor 40 drives the rotation of the basket 50 in a gentle manner in order to carefully preserve the nutrients in natural breast milk. As shown at the beginning of the warming process in the exemplary refrigerated natural breast milk in FIG. 28, a layer of fat 63 in the breast milk has separated from the bulk of the more viscous milk fluid and collects at the top of the milk and to the walls of the bottle container 60.

It is commonly understood that gently mixing the fluid contents of the refrigerated milk as it is warmed up more carefully preserves the important nutrients in the fat 63 of the breast milk. That is, the fat from breast milk is an important ingredient part of a baby's nutritional diet. During the refrigeration of breast milk process, the fat 63 from the milk separates in the solution and will accumulate on the solution at the top of the bottle container 60 as shown in FIG. 28. Likewise, the fat 63 tends to stick to the inner surfaces of the bottle container 60 during the refrigerating process. As understood, at different times of the day, a mother expresses different quantities of fat in her breast milk as well.

Unfortunately, to the detriment of the nutritional value provided in the milk, briskly shaking a bottle with breast milk to mix the fat back into the solution can be more harmful to the nutritional milk solution, as the violent shaking will break down the important necessary nutrients therein. Therefore, as understood by this subject disclosure, it is important to gently spin the bottle container 60 to preserve the solution's nutrients. Furthermore, gently heating the bottle container 60 will melt the fat causing it to release from the inner surfaces of the bottle container 60, which can then mix back into the solution during rotation and provide the important nutrients back to the infant to be fed by the bottle container 60. Accordingly, the rotation of the basket 12 and hence the bottle container 60 according to this subject disclosure is performed in a gentle manner so that the fat 63 in the milk is carefully liquefied and allowed to uniformly mix back into the warm breast milk.

Figure 29:
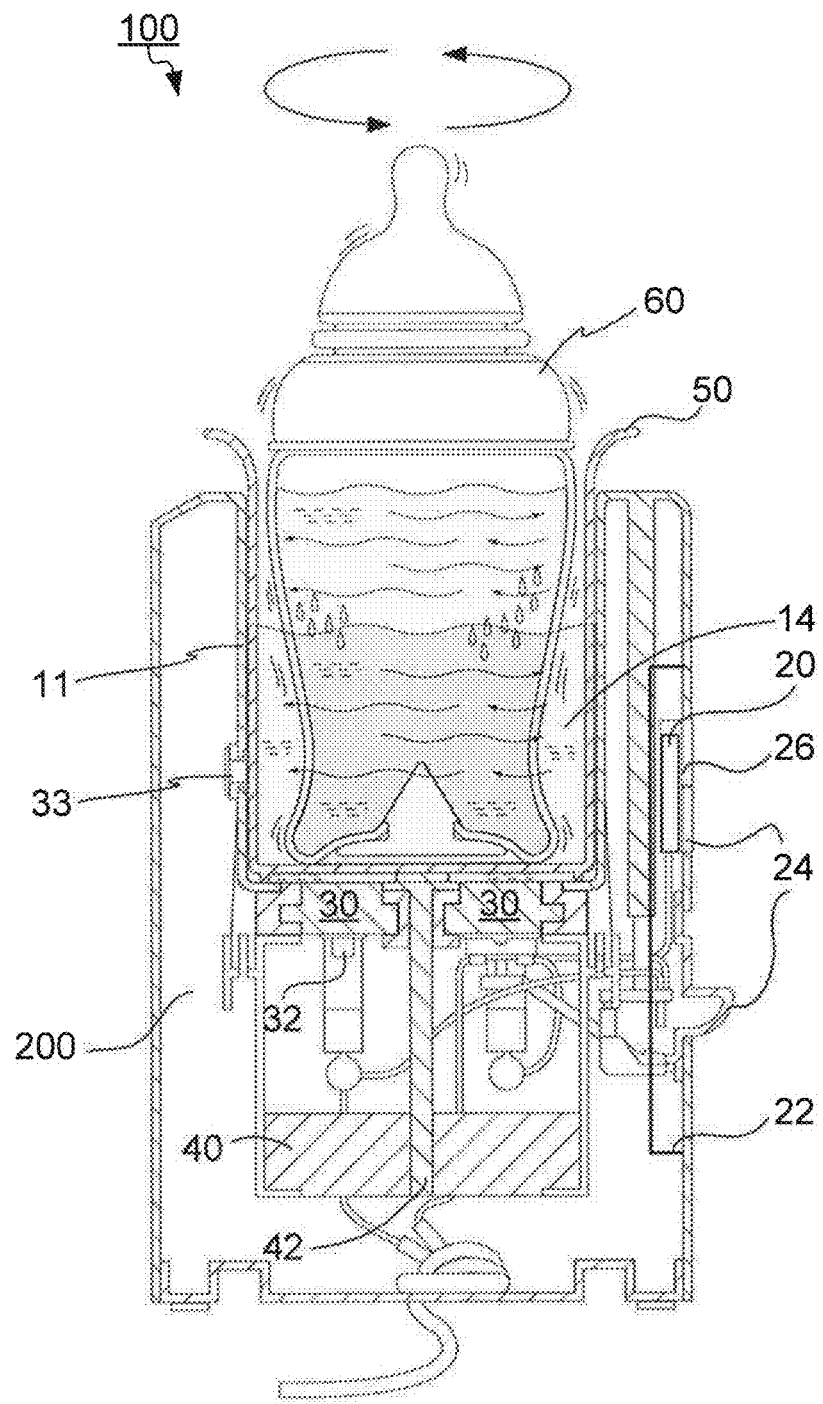
FIG. 29 depicts a third step in which an activation switch on the control panel is initiated to begin the container warming process.

In a third step as shown in FIG. 29, an activation switch 24 on the control panel is initiated and the container warming process begins. The control circuitry of the ECU 20 sends an instruction signal to the heating element 30 to begin warming at a predetermined temperature as shown by the bubbling of the first fluid 61 in the reservoir 14. Likewise, an instruction signal is also sent to the motor 40 to begin rotation of the basket 50 holding the container 60. The heating and gentle rotation of the container 60 allows the fat 63 to be gently melted and carefully liquefied uniformly back into the warm breast milk.

The thermostats 32, 33 sensing the temperature of the reservoir and the temperatures of the heating elements coordinate to warm the second fluid 62 within the container 60 to approximately 98.6 degree to mimic the temperature of the milk from a mother's breast. Temperature sensed signals from the thermostats 32, 33 are relayed to and from the various heating elements in order to optimize the heating control by the ECU 20 while warming the second fluid 62 in the container 60 to a desired predetermined temperature.

Figure 32:
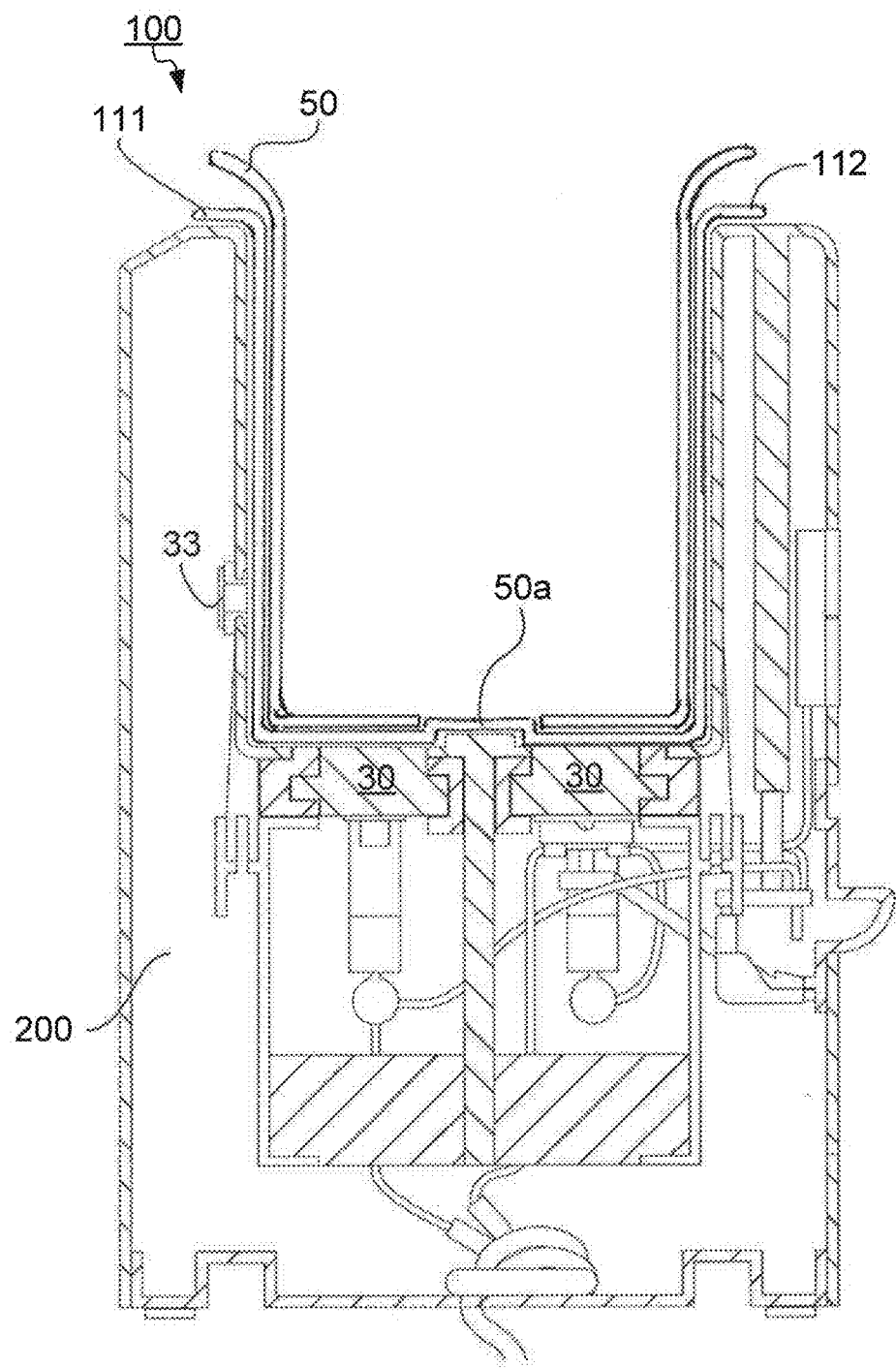
FIG. 32 depicts another exemplary embodiment for the warming device in which the basket is placed within a removable chamber having high heat conductivity properties.

In one embodiment, the heating element 30 may be in direct contact with the first fluid 61 in the reservoir 14 such that upon activation, the first fluid 61 in the reservoir 14 is directly heated. Alternatively, such as shown in FIG. 32, the heating element 30 may transfer its heat through another conducting material 50a placed between the heating element 30 and the basket 50 and bottle container 60 which has high conductivity properties to conduct the heat from the heating element 30 through the conducting material 50a into the first fluid 61 in the reservoir 14.

At about the same time, another signal is sent from the control circuit of the ECU 20 to the motor 40 to begin rotation of the drive shaft 42, which in turn is transmitted to turn the basket 60 through the interconnection mechanism 55. Instructions are also sent indicating the desired rate of rotation suitable to maximize the conduction of the heat from the first fluid 61 into the second fluid 62 carried by the container of the container 60.

Figure 30:
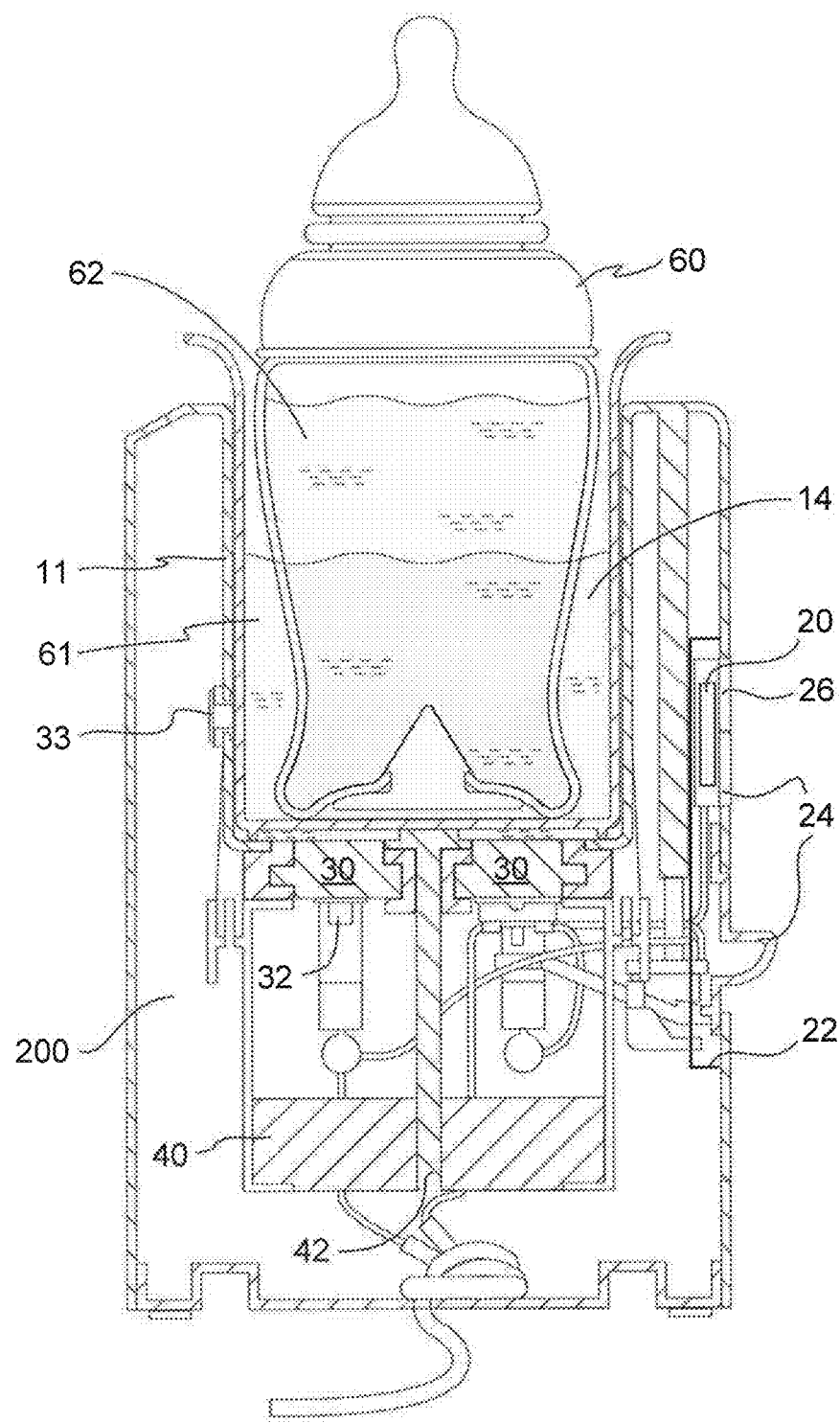
FIG. 30 shows a fourth step in which the container has been warmed and the heating and rotating of the basket has concluded and the container may be removed from the warming device.

In a fourth step as shown in FIG. 30, the first fluid 61 in the container is warmed to a suitable temperature, as detected by the thermostat 33 and monitored by the timing circuit, and a subsequent instruction is sent from the control circuitry of the ECU 20 to turn off the heating element 30 and the rotation of the drive shaft 42. At any time, the user may interact with the various input/output devices 24 to turn off the warming device 100 or alter the desired temperature or rotation speed/pattern of the container 60 to move manually from the third step to the fourth step.

As previously mentioned, various illumination source lights 21 may be provided on the display 26 of the control panel 22 to coincide with these various stages to inform the user of the warming device where at in the process the warming of the container 60 may be.

Figure 31:
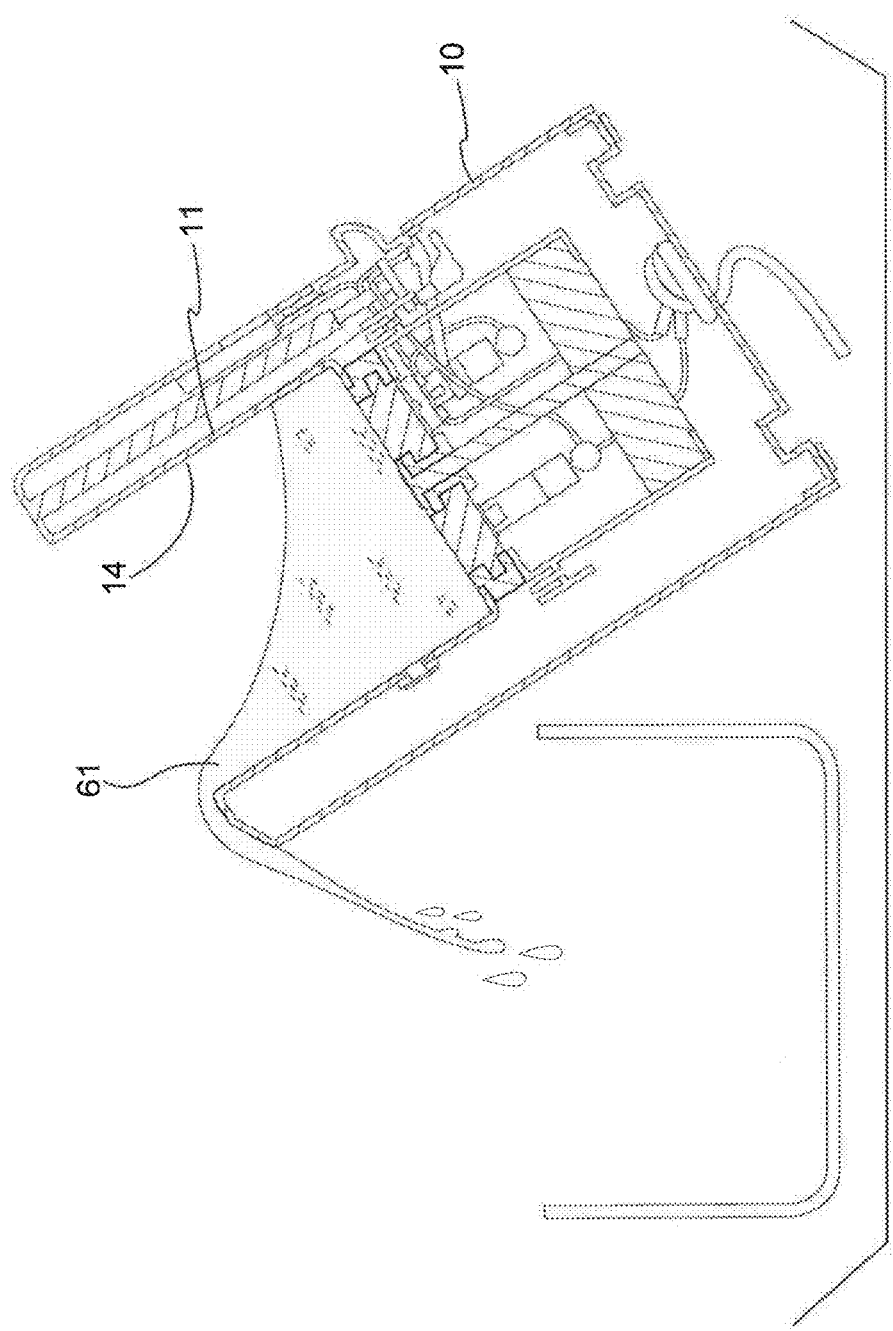
FIG. 31 illustrates the final draining step in which the first fluid in the water chamber may be emptied from the warming device and cleaned for use at a later time.

In a final step as shown in FIG. 31, the liquid in the reservoir 14 may be emptied and cleaned out for use at a later time.

Figure 11:
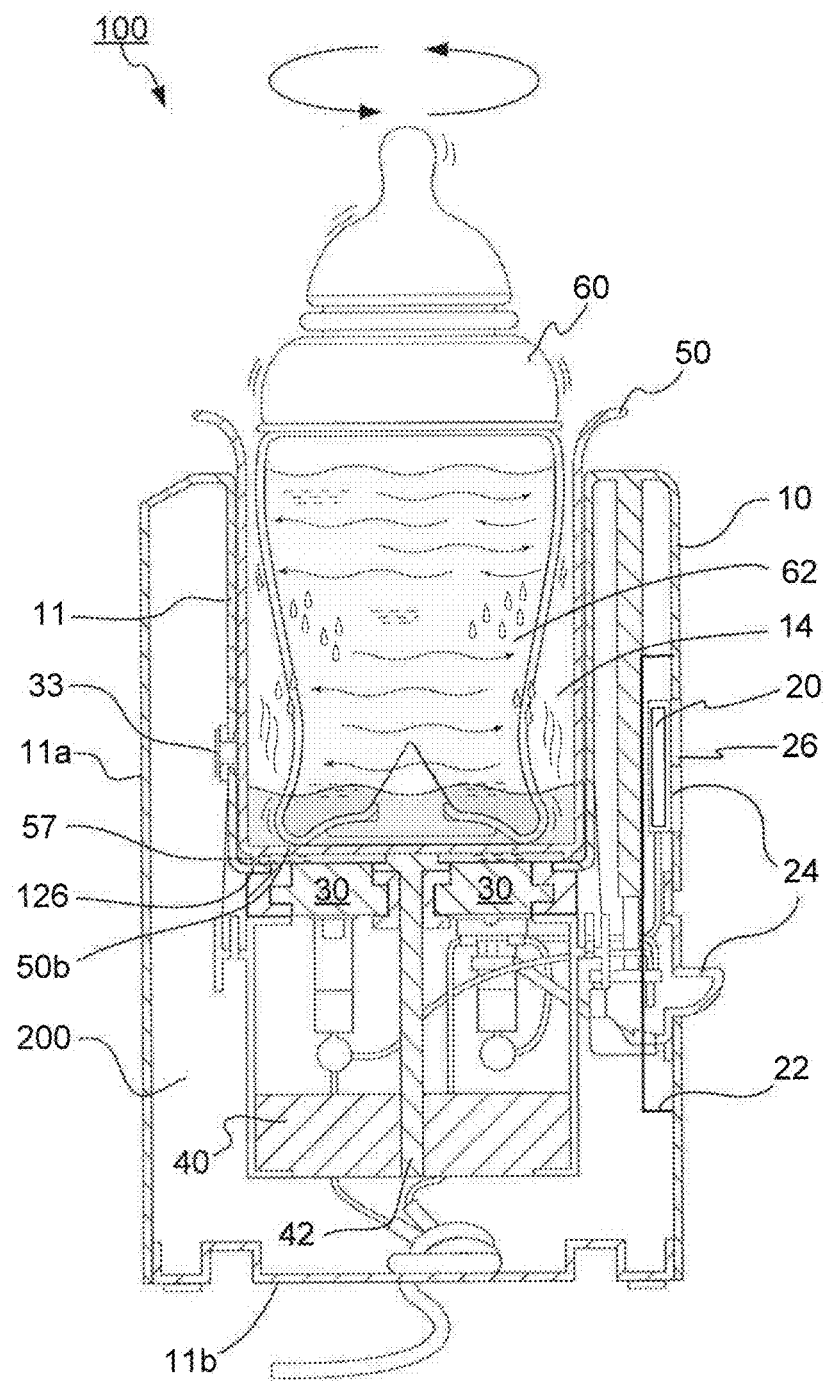
FIG. 11 shows an alternative process of the warming process in which water is filled to be steamed into the warming chamber of the housing in which the drive shaft of the motor is interconnected to the lower end of the basket.

FIG. 11 illustrates an exemplary method of agitating and warming a second fluid 62 in a container 60 with a warming device 100 by heating a first fluid 61 to a steam within a reservoir 14. In use as a water steaming unit, the first fluid in the reservoir 12 is heated to a predetermined temperature until the first fluid 61 is converted to a vapor. The reservoir 14 holds the first fluid 61 to be converted into steam by the heating element 30.

In a first step, a first fluid 61 (such as water) or reservoir 14 is filled within the warming chamber 12 of the warming device 100. In a second step, the container 60 is positioned into the basket 50. The container may or may not be partially submerged into the first fluid 61 provided in the warming chamber 12.

In a third step, the activation switch 24 on the control panel is initiated and the container warming process begins. The control circuitry of the ECU 20 sends an instruction signal to the heating element 30 to begin elevating the temperature of the heating elements 30 to an elevated heat temperature to convert the first fluid 61 into vapor. Here, the thermostat 33 measures the temperature of the vapor and relays that information to the ECU 20 so that the ECU 20 can control the temperature of the heat applied to heat the second fluid 62 within the container 60. As shown, the vapor rises from the first fluid 61 in the warming chamber 12 and up around the outer surface wall 64 of the container 60 while the container 60 is being rotated by the drive shaft 42. Heat is transferred across the outer surface wall 64 of the container 60 into the second fluid 62 being warmed within the container 60 to approximately 98.6 degrees.

In a fourth step, the second fluid 62 in the container 60 has been warmed to a suitable temperature, and a subsequent instruction is sent from the control circuitry of the ECU 20 to turn off the heating element 30 and the rotation of the motor drive shaft 42.

Figure 12:
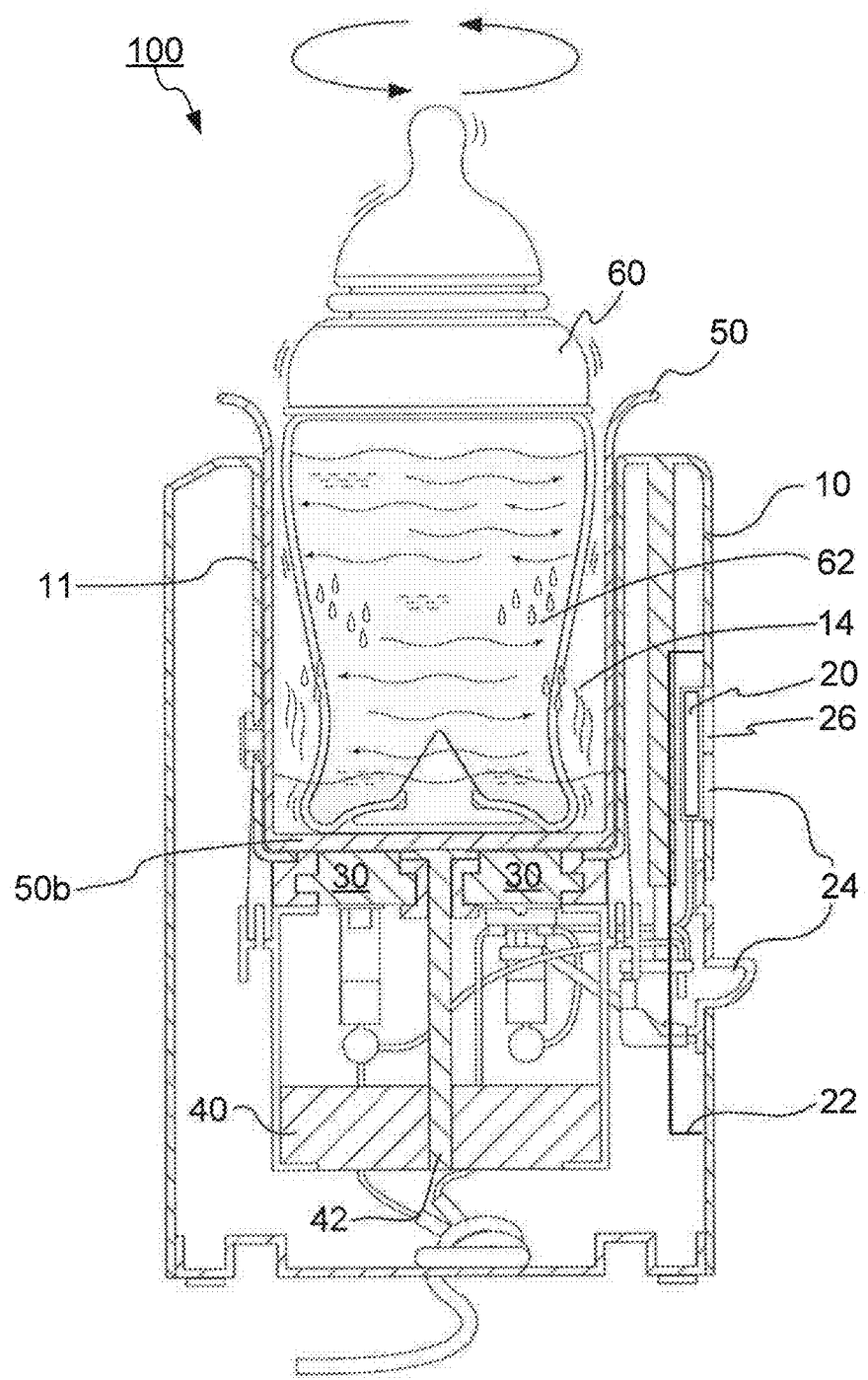
FIG. 12 illustrates another exemplary embodiment in which the lower end of the basket is composed of a basket heat conducting material with enough heat to cause the fluid therein to steam in order to warm the fluid inside of the container as it is agitated from the steam and the rotation of the basket.
Figure 13:
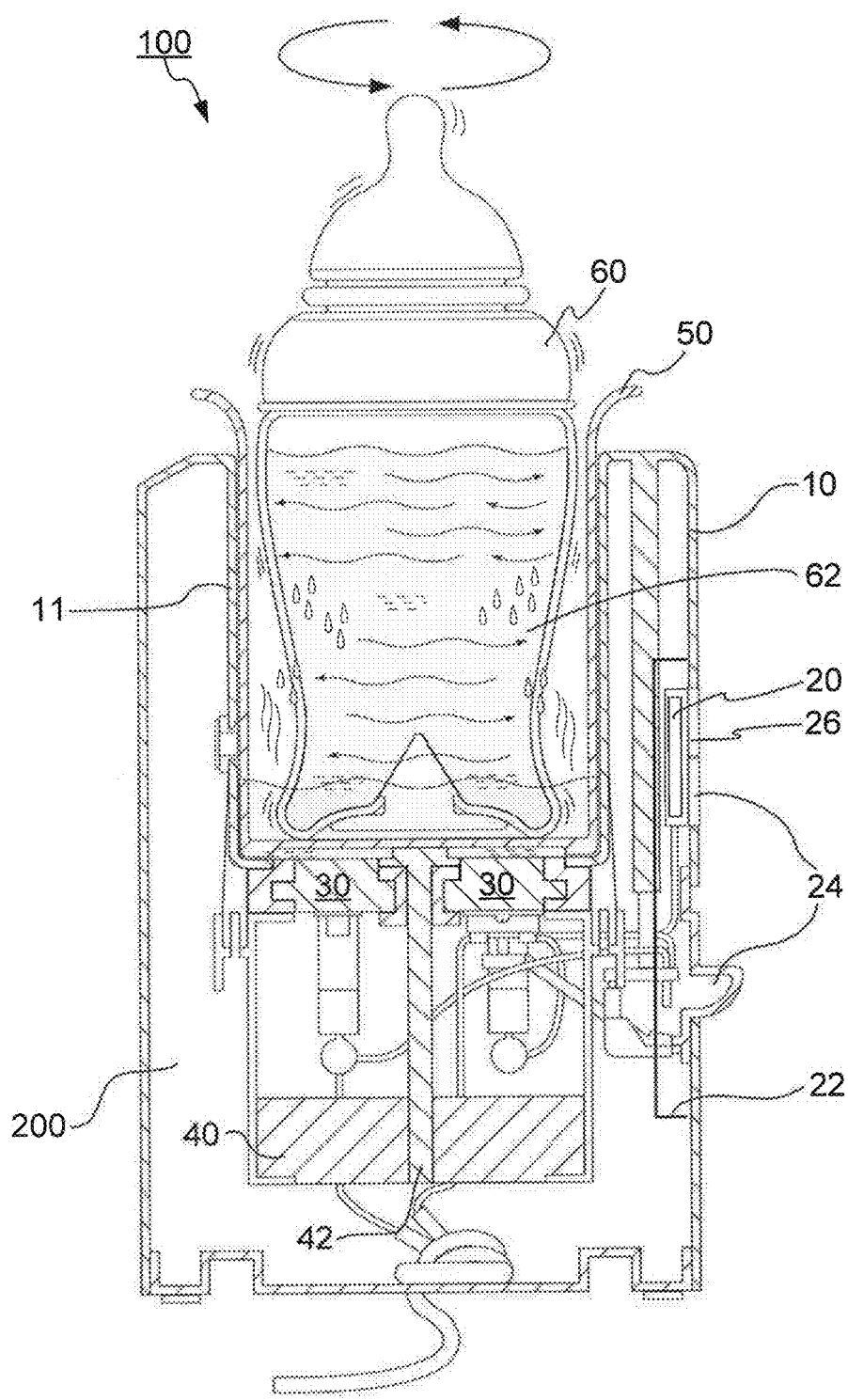
FIG. 13 depicts another exemplary embodiment in which the lower end of the basket is perforated to allow the heating element to be disposed adjacent to the fluid in the warming chamber to cause the fluid therein to steam in order to warm the fluid inside of the container as it is agitated from the steam and the rotation of the basket.
Figure 14:
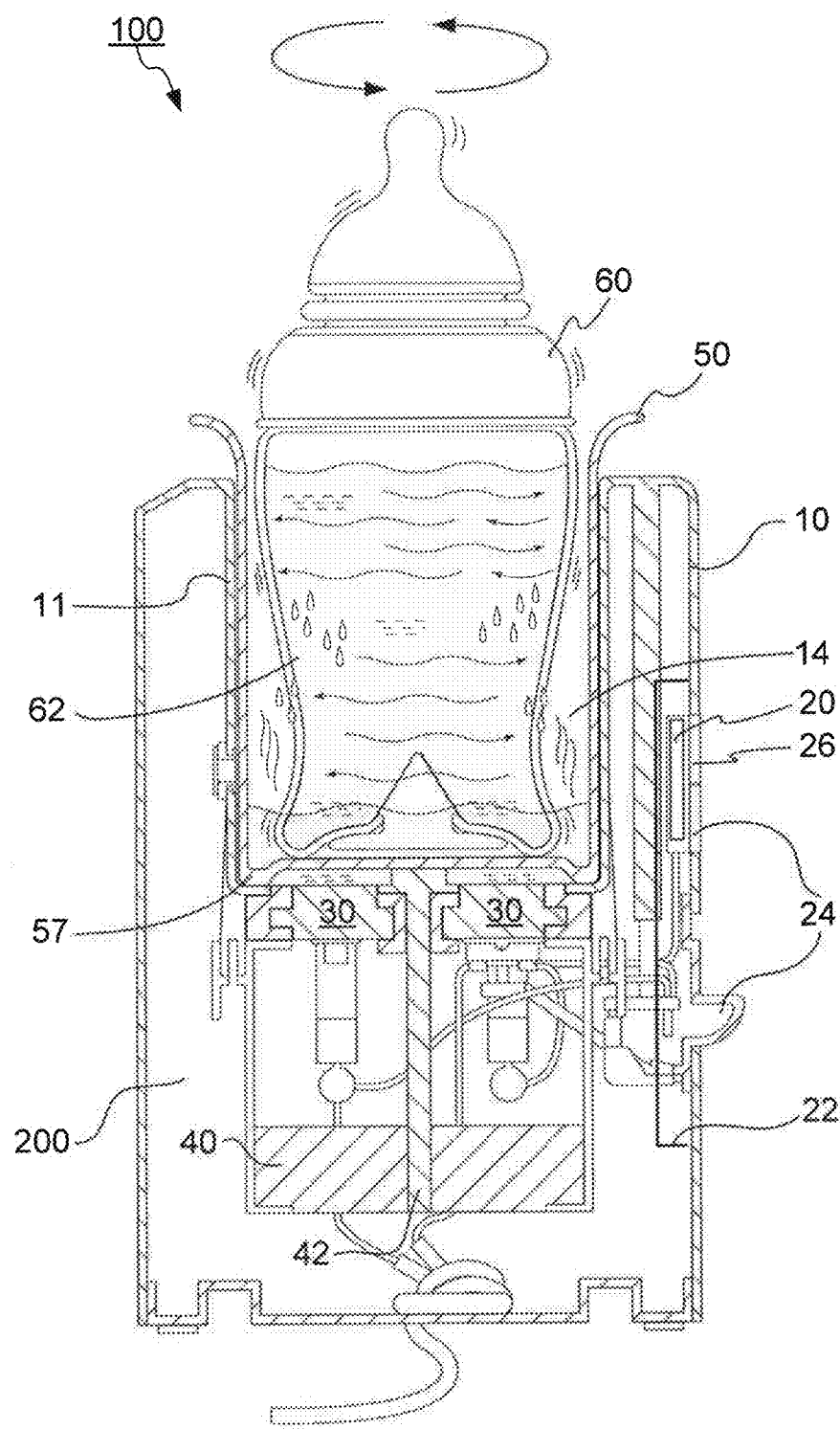
FIG. 14 shows another exemplary embodiment in which the lower end of the basket is raised higher and perforated to allow the heating element to be disposed adjacent to the fluid in the warming chamber to cause the fluid therein to steam in order to warm the fluid inside of the container as it is agitated from the steam and the rotation of the basket.

FIGS. 11-14 also depict various different basket 50 configurations which can be used in both methods of heating the container 60 discussed above. FIGS. 11 and 14 show the basket 50 with a concentric rim 57. The rim 57 in FIG. 11 is in the form of a projection extruding downward from a bottom surface of the basket 50. The rim 57 in FIG. 14 is an extension of a side wall of the basket which turns under to form the rim, which then extends radially upward and towards a center of the basket 50. The rim 57 creates a space 15 in the reservoir 14 between the container 60 and a bottom surface 12b of the warming chamber 12. The space 15 allows for a greater heat gradient to collect between the container 60 and the heating element 30. Bottom surface 50b of the basket 50 may also be flat with little space between the bottom surface 50b and being directly heated by the heating element 30, as shown in FIG. 12.

Figure 25:
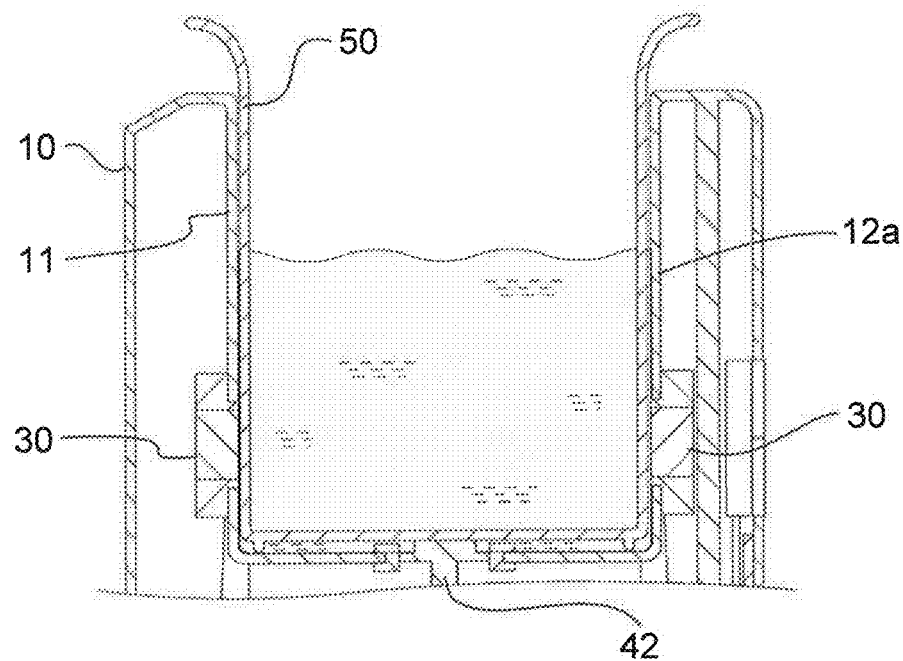
FIG. 25 illustrates another exemplary embodiment in which the heating elements are disposed on the sides of the warming chamber.

FIG. 25 illustrates another exemplary embodiment in which the heating elements 30 are disposed in various locations within the warming device 100. As shown herein, the heating elements 30 are integrated into the side walls 12a of the warming chamber 12. In this configuration, the drive shaft 42 is unimpeded by, and disposed further from the heating elements 30 while rotating the container 60.

Figure 26:
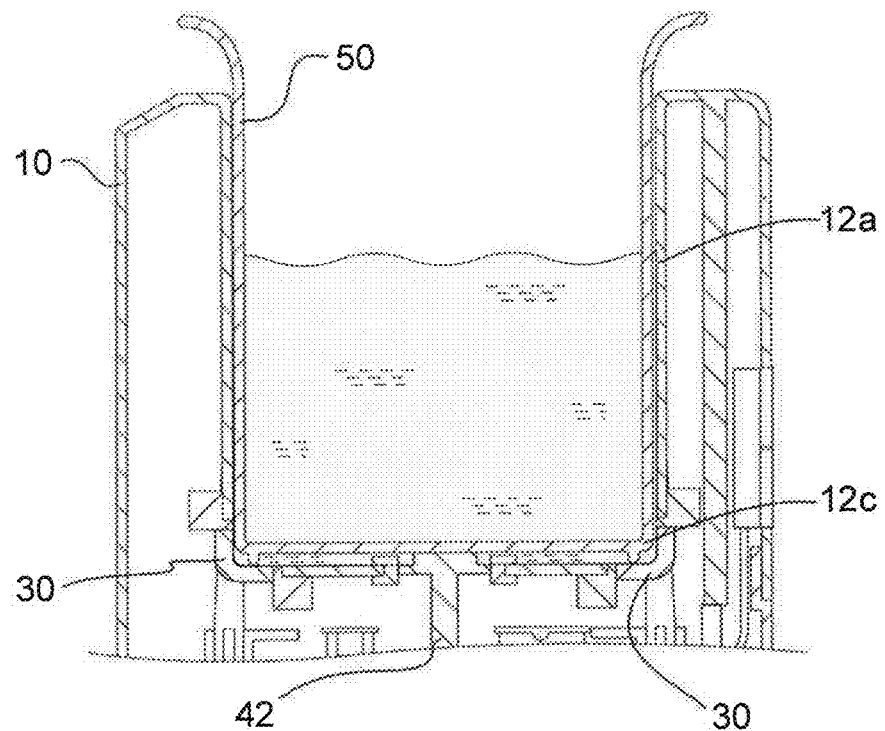
FIG. 26 shows another embodiment in which the heating elements are disposed adjacent to the lower corner edges of the heating chamber.

FIG. 26 shows yet another embodiment in which the heating elements 30 are disposed adjacent to the lower corner edges 12c of the warming chamber 12. Each configuration in FIGS. 25-26 provides a different heat gradient for the first fluid 61 within the warming chamber 12. Likewise, the drive shaft 42 of the motor 40 is unimpeded and not disposed through the heating elements 30 as they are disposed along the lower corner edges 12c of the heating chamber 12.

FIG. 32 shows the warming device 100 having a removable warming chamber 112. The removable warming chamber 112 may be constructed in a variety of different ways. For example, the removable warming chamber 112 may be manufactured from stainless steel or any other suitable heat conducting material. The removable warming chamber 112 may be generally cylindrical and adapted to receive the basket 50 within an inner contour. The removable warming chamber 112 may also have various mating features which engage secondary mating features of the basket 50 to secure a concentric connection. The removable warming chamber 112 is constructed of suitable heat conductive material adapted to transfer heat easily.

Figure 33:
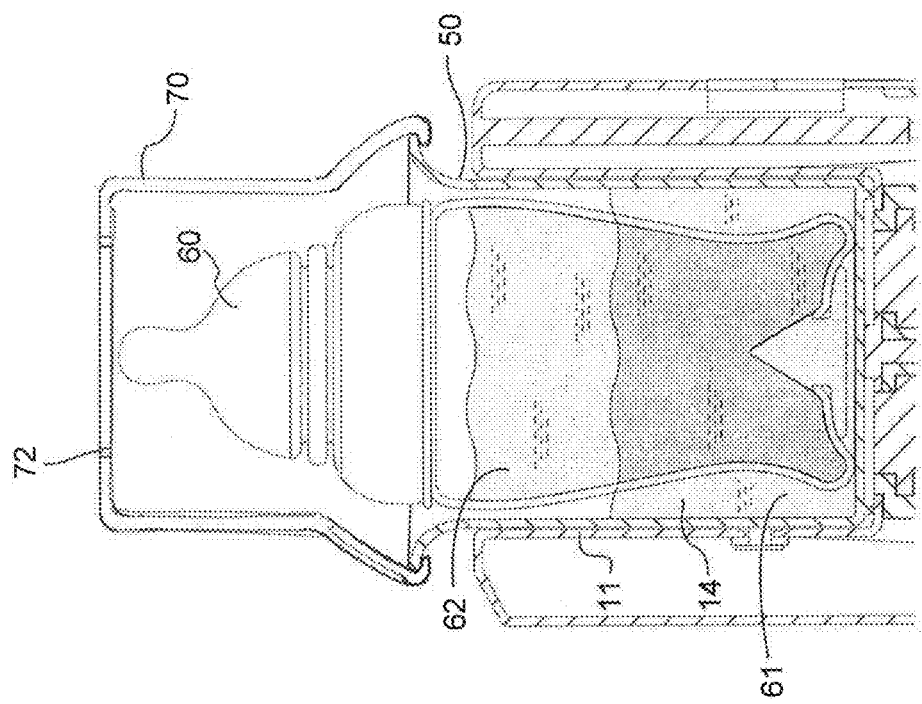
FIG. 33 illustrates an exemplary cover adapted for use over and connectable to the basket.

FIG. 33 depicts the basket 50 having a cap 70. The cap 70 may be provided to further secure the container 60 within the basket 50. Further, the cap 70 may also act to trap the steam vapor produced by the heating of the first fluid 61 within the reservoir 14, and thereby increase the internal temperature of the warming chamber 11. However, the cap 70 may also include a plurality of vents 72 to allow the steam vapor to escape into the atmosphere in a controlled manner. The cap 70 may connect to the basket 50 by way of a snap fit, threaded connection, or other suitable connecting mechanism.

Figure 34:
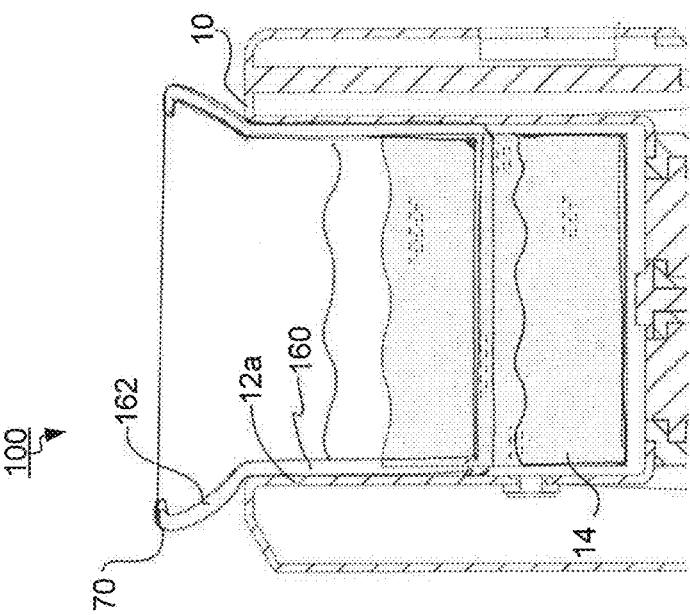
FIG. 34 shows the cover adapted for use as a container for heating an item of food in the cover within the warming chamber of the warming device.

FIG. 34 shows the warming device 100 wherein the cap 70 may be used as a food warming chamber 160. As such, the food chamber 160 may have a concentric rim 162 which rests on an upper edge of the outer surface 12a of the housing 10. The food warming chamber 160 may be placed above a first fluid 61 bath disposed within the reservoir 14 and heated according to the subject disclosure above.

In an alternative embodiment as shown in FIG. 35, the motor 40 and drive shaft 42 are configured and positioned to drive the basket 50 closer to the upper end of the basket 50. That is, the basket 50 comprises a geared inter-engagement mechanism 55 which interconnects with a drive gear 44 on the drive shaft 42. The mating element for the geared inter-engagement mechanism 55 may be a driven or slave gear 52 integrated onto the basket 50. For example, the slave gear 52 may be disposed concentric about an upper edge of the basket 50 as shown. The geared inter-engagement mechanism 55 may also be made of several apertures or protrusions along the side wall of the basket 50 or a geared rim about a concentric bottom edge. The motor 40 may be located within, and on one side of, the housing 10 or in any position suitable to interconnect to, and engage the drive shaft 42 with the geared inter-engagement mechanism 55.

Figure 36:
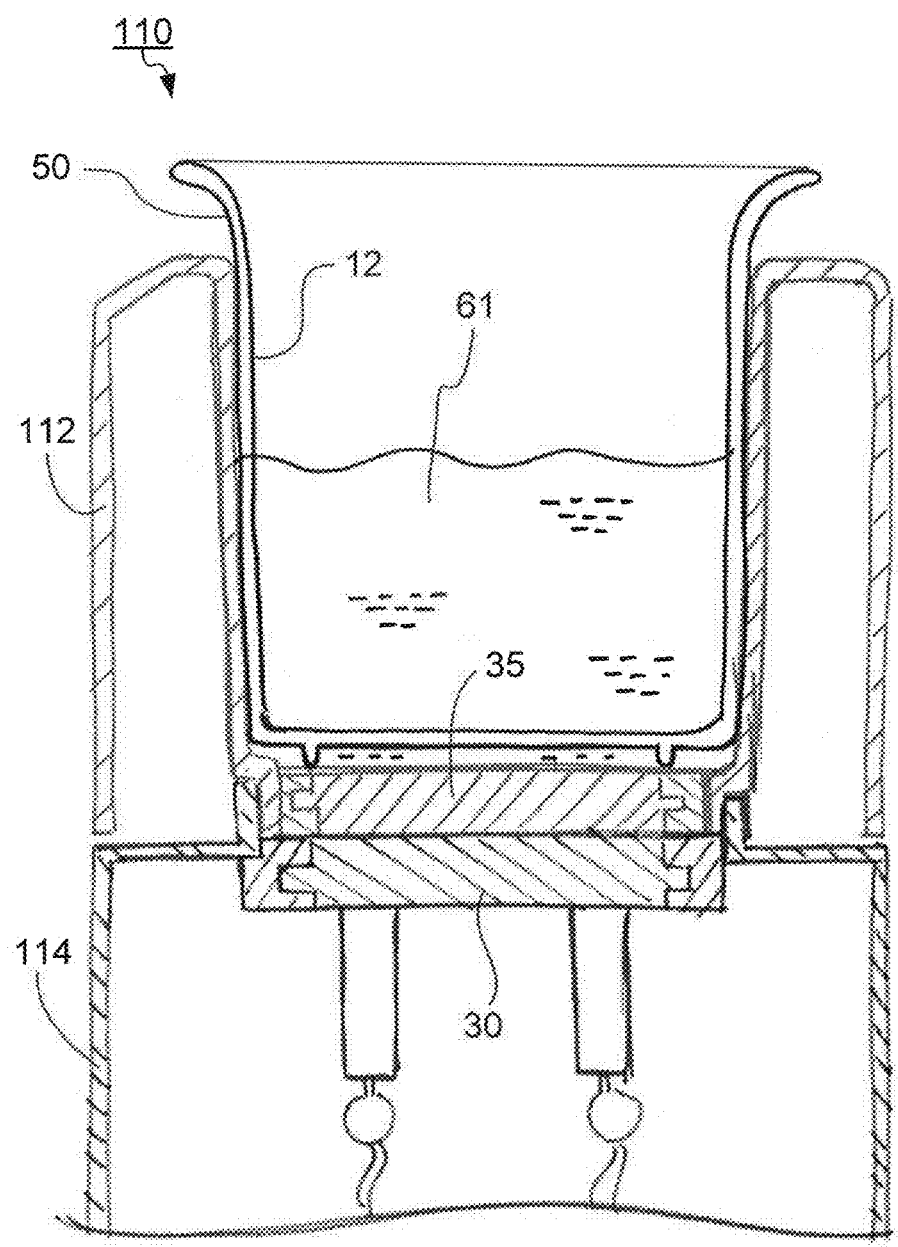

FIG. 36 illustrates another exemplary construction for a separable housing 110 having an upper warming chamber housing 112 and a lower control chamber 114. The upper warming chamber housing 112 is separable from the lower control chamber 114. In the lower control chamber 114, the lower control elements, motor 40 and heating elements 20 may be disposed. The upper warming chamber housing 112 may include the construction of the warming chamber 12 and the basket 50. The upper warming chamber housing 112 may be easily separated from the lower control chamber 114 for cleaning purposes and the like. A heat transfer material 35 may be included within the separable housing 110 to conduct temperature from the heating element 30 in the lower control chamber 114 to the first fluid 61 within the upper warming chamber housing 112.

The upper warming chamber housing 112 may connect to the lower control chamber 114 by snap fit, interlocking members, a threaded connection, or other suitable method. Further, the lower control chamber 114 may have a failsafe mechanism which prevents the heating element 30 from receiving and/or cutting off power if the upper warming chamber housing 112 is not attached.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A warming device that heats and agitates a container comprising:
   a housing having an enclosed chamber and a concentric warming chamber adapted to receive a first fluid;
   a perforated concentric basket having an inwardly extending rib and adapted to be received within the warming chamber and to secure the container partially submerged within the first fluid which is to be warmed therein, wherein the inwardly extending rib is inward biased and adapted to restrictively reflex outward to grab an outer surface of the container;
   at least one heating element adapted to heat the first fluid in the warming chamber to warm an exterior surface of the container;
   a motor adapted to agitate and warm a second fluid in the container by rotating the concentric basket at a predetermined rate, wherein the motor operates a pump to re-circulate the first fluid around the container, the pump provides a directed jet stream of the first fluid from an outlet having a nozzle construction that impacts a flat surface on the concentric basket that is positioned substantially perpendicular to the directed jet stream to uniformly rotate the concentric basket within the warming chamber at the predetermined rate, which in turn agitates and warms the second fluid in the container; and
   a control panel that provides various signal instructions to the heating element and the motor.

2. The warming device recited in claim 1, wherein the housing further comprises:
   an upper portion, having the concentric warming chamber and the concentric basket; and
   a lower portion, having the control panel, the upper portion and the lower portion are separable and detachable from each other.

3. The warming device recited in claim 1, wherein the concentric basket further comprises:
   at least one perforation in at least one surface of the basket, selected from at least one of a bottom of the basket and a wall of the basket; and
   at least one tab adapted to secure the concentric basket by a snap lock connection.

4. The warming device recited in claim 1, further comprising a safety mechanism adapted to prevent the heating element from functioning when one or more of the following conditions are present:
   the warming device tips over side-ways a predetermined angle from a substantially level surface; and
   the first fluid in the warming chamber exceeds a threshold temperature.

5. The warming device recited in claim 1, wherein the control panel further comprises:
   a display;
   an input/output device; and
   an electronic control unit (ECU) electronically connected to control the heating element and the motor.

6. The warming device recited in claim 1, wherein the motor has a drive gear coupled to power a driven gear on the concentric basket.

7. The warming device recited in claim 1, wherein the heating element heats the first fluid to a steam vapor such that the steam vapor rises up over the exterior surface of the container and warms the second fluid in the container.

8. A warming device that heats and agitates a container comprising:
   a housing having an enclosed chamber and a concentric warming chamber adapted to receive a first fluid;
   a perforated concentric basket having an inwardly extending rib and positioned within the warming chamber that secures the container which is warmed therein, wherein the inwardly extending rib is inward biased and adapted to restrictively reflex outward to grab an outer surface of the container;
   a heating element that heats the first fluid in the warming chamber;
   a motor that rotates the concentric basket within the warming chamber at a predetermined rate, the uniform rotation agitates and warms a second fluid in the container, wherein the motor operates a pump to re-circulate the first fluid around the container, wherein the pump provides a directed jet stream of the first fluid from an outlet having a nozzle construction that impacts a flat surface on the concentric basket that is positioned substantially perpendicular to the directed jet stream to uniformly rotate the concentric basket within the warming chamber at the predetermined rate, which in turn agitates and warms the second fluid in the container; and
   a control panel that provides various signal instructions to the heating element and the motor, comprising:
   a display;
   an input/output device; and
   an electronic control unit (ECU) electronically connected to control the heating element and the motor.

9. The warming device recited in claim 8, wherein the housing further comprises:
   an upper portion, having the concentric warming chamber and the concentric basket; and
   a lower portion, having the control panel, the upper portion and the lower portion are separable and detachable from each other.

10. The warming device recited in claim 8, wherein the concentric basket further comprises:
    at least one perforation in at least one surface of the basket, selected from at least one of a bottom of the basket and a wall of the basket; and
    inwardly extending ribs adapted to compress against the container.

11. The warming device recited in claim 8, wherein the motor has a drive gear coupled to power a driven gear on the concentric basket.

12. The warming device recited in claim 8, wherein the heating element heats the first fluid to a steam vapor such that the steam vapor rises up over the exterior surface of the container and warms the second fluid in the container.

13. A warming device that heats and agitates a container comprising:

a housing having an enclosed chamber and a concentric warming chamber adapted to receive a first fluid;

a perforated concentric basket having an inwardly extending rib and adapted to be received within the warming chamber and to secure the container which is to be warmed therein, wherein the perforated concentric basket has a slave gear integrated concentrically about an upper edge of a rim therein, and wherein the inwardly extending rib is inward biased and adapted to restrictively reflex outward to grab an outer surface of the container;

a heating element adapted to heat the first fluid in the warming chamber to warm a second fluid in the container;

a motor having a drive gear adapted to engage the slave gear and uniformly rotate the perforated concentric basket within the warming chamber at a predetermined rate, the uniform rotation agitates and warms the second fluid in the container and the motor operates a pump to re-circulate the first fluid around the container; and a control panel adapted to provide various signal instructions to the heating element and the motor.

14. The warming device recited in claim 13, wherein an intermediate gear is disposed between the drive gear and the slave gear.

15. The warming device recited in claim 13, wherein the perforated concentric basket has a basket snap lock connection to the housing.

16. The warming device recited in claim 13, wherein the slave gear is disposed on an outer surface of the perforated concentric basket.

17. The warming device recited in claim 13, wherein a connection between the drive gear and the slave gear is located adjacent to at one of: a side; a corner; a top; or a bottom, of the concentric warming chamber.

18. The warming device recited in claim 13, wherein the heating element heats the first fluid to a steam vapor such that the steam vapor rises up over the exterior surface of the container and warms the second fluid in the container.

* * * * *